US010729975B1

(12) United States Patent
Windrem et al.

(10) Patent No.: US 10,729,975 B1
(45) Date of Patent: Aug. 4, 2020

(54) NETWORK CONNECTION SELECTION PROCESSING SYSTEM

(71) Applicant: Electronic Arts Inc., Redwood City, CA (US)

(72) Inventors: Daniel Aaron Windrem, Redwood City, CA (US); David Brian O'Neill, North Vancouver (CA); James Lawrence Brookes, St. Louis, MO (US); Martin Clouâtre, Chambly (CA); Mark Ryan Waller, San Jose, CA (US)

(73) Assignee: Electronic Arts Inc., Redwood City, CA (US)

( * ) Notice: Subject to any disclaimer, the term of this patent is extended or adjusted under 35 U.S.C. 154(b) by 263 days.

(21) Appl. No.: 15/085,199

(22) Filed: Mar. 30, 2016

(51) Int. Cl.
*A63F 13/34* (2014.01)
*H04L 29/08* (2006.01)

(52) U.S. Cl.
CPC ............ *A63F 13/34* (2014.09); *H04L 67/104* (2013.01); *H04L 67/28* (2013.01); *H04L 67/322* (2013.01)

(58) Field of Classification Search
CPC ....... A63F 13/34; H04L 67/104; H04L 67/28; H04L 67/322
USPC .......................................................... 463/42
See application file for complete search history.

(56) References Cited

U.S. PATENT DOCUMENTS

| | | |
|---|---|---|
| 5,813,913 A | 9/1998 | Berner et al. |
| 5,894,556 A | 4/1999 | Grimm et al. |
| 5,961,386 A | 10/1999 | Sawaguchi |
| 5,964,660 A | 10/1999 | James et al. |
| 6,012,096 A | 1/2000 | Link et al. |
| 6,015,348 A | 1/2000 | Lambright et al. |
| 6,023,729 A | 2/2000 | Samuel et al. |
| 6,038,599 A | 3/2000 | Black et al. |
| 6,128,660 A | 10/2000 | Grimm et al. |
| 6,322,451 B1 | 11/2001 | Miura |
| 6,641,481 B1 | 11/2003 | Mai et al. |
| 6,699,125 B2 | 3/2004 | Kirmse et al. |

(Continued)

OTHER PUBLICATIONS

Agarwal, S., et al., "Matchmaking for online games and other latency-senstive P2P systems." In ACM SIGCOMM Computer Communication Review, vol. 39, pp. 315-326, ACM, 2009.

(Continued)

*Primary Examiner* — Jay Trent Liddle
*Assistant Examiner* — Ryan Hsu
(74) *Attorney, Agent, or Firm* — Knobbe, Martens, Olson & Bear, LLP

(57) ABSTRACT

Embodiments of a system and method for dynamically selecting a communication technology based at least in part on the success in forming a peer-to-peer connection for playing an instance of a video game are disclosed. Further, the systems may dynamically select a communication technology based on the quality of service of an established communication connection between two or more computing systems corresponding to two or more users attempting to play the instance of the video game. In some embodiments, the identification of a communication technology may occur during a gaming session and the communication technology used at the start of the game play session may be transitioned to another communication technology enabling the maintenance of a level of quality of service.

20 Claims, 8 Drawing Sheets

(56) References Cited

U.S. PATENT DOCUMENTS

| | | |
|---|---|---|
| 6,701,344 B1 | 3/2004 | Holt et al. |
| 6,714,966 B1 | 3/2004 | Holt et al. |
| 6,732,147 B1 | 5/2004 | Holt et al. |
| 6,755,743 B1 | 6/2004 | Yamashita et al. |
| 6,829,634 B1 | 12/2004 | Holt et al. |
| 6,910,069 B1 | 6/2005 | Holt et al. |
| 6,920,497 B1 | 7/2005 | Bourassa et al. |
| 7,016,942 B1 | 3/2006 | Odom |
| 7,031,473 B2 | 4/2006 | Morais et al. |
| 7,169,051 B1 | 1/2007 | Mossbarger |
| 7,240,093 B1 | 7/2007 | Danieli et al. |
| 7,264,243 B2 | 9/2007 | Yoseloff et al. |
| 7,287,076 B2 | 10/2007 | Ewanchuk et al. |
| 7,288,028 B2 | 10/2007 | Rodriguez et al. |
| 7,430,719 B2 | 9/2008 | Pettinati et al. |
| 7,470,197 B2 | 12/2008 | Massey et al. |
| 7,549,125 B2 | 6/2009 | Dunn et al. |
| 7,636,719 B2 | 12/2009 | Thompson et al. |
| 8,360,845 B1 | 1/2013 | Hsu |
| 8,782,121 B1 | 7/2014 | Chang |
| 8,882,588 B2 | 11/2014 | Buhr |
| 9,199,173 B2 | 12/2015 | Jensen |
| 9,630,113 B1 | 4/2017 | Jensen |
| 9,776,091 B1 | 10/2017 | Lebrun et al. |
| 9,993,735 B2 | 6/2018 | Aghdaie et al. |
| 10,091,281 B1 | 10/2018 | Lockhart |
| 10,207,191 B2 | 2/2019 | Jensen |
| 10,286,327 B2 | 5/2019 | Xue et al. |
| 2001/0044339 A1 | 11/2001 | Cordero et al. |
| 2002/0037767 A1 | 3/2002 | Ebin |
| 2002/0086732 A1 | 7/2002 | Kirmse et al. |
| 2002/0119821 A1* | 8/2002 | Sen ................... A63F 13/12 463/42 |
| 2002/0195775 A1 | 12/2002 | Webb et al. |
| 2003/0152034 A1* | 8/2003 | Zhang ............. H04L 29/12509 370/252 |
| 2003/0212597 A1 | 11/2003 | Ollins |
| 2003/0236878 A1 | 12/2003 | Egi |
| 2004/0097287 A1 | 5/2004 | Postrel |
| 2004/0116186 A1 | 6/2004 | Shim et al. |
| 2004/0143852 A1 | 7/2004 | Meyers |
| 2004/0192440 A1 | 9/2004 | Evans et al. |
| 2004/0215756 A1 | 10/2004 | VanAntwerp et al. |
| 2004/0248652 A1 | 12/2004 | Massey et al. |
| 2004/0255032 A1 | 12/2004 | Danieli |
| 2005/0033601 A1 | 2/2005 | Kirby et al. |
| 2005/0091399 A1* | 4/2005 | Candan ............ H04L 29/06027 709/238 |
| 2005/0181878 A1 | 8/2005 | Danieli et al. |
| 2005/0192097 A1 | 9/2005 | Farnham et al. |
| 2005/0227760 A1 | 10/2005 | Vlazny et al. |
| 2006/0121990 A1 | 6/2006 | O'Kelley, II et al. |
| 2006/0217167 A1 | 9/2006 | Jubinville et al. |
| 2006/0247055 A1 | 11/2006 | O'Kelley, II et al. |
| 2006/0258463 A1 | 11/2006 | Cugno et al. |
| 2006/0287096 A1 | 12/2006 | O'Kelley, II et al. |
| 2006/0287099 A1 | 12/2006 | Shaw et al. |
| 2007/0035548 A1 | 2/2007 | Jung et al. |
| 2007/0094279 A1* | 4/2007 | Mittal .................. H04L 67/104 |
| 2008/0026846 A1 | 1/2008 | McMaster |
| 2008/0311981 A1 | 12/2008 | Schugar |
| 2009/0098921 A1 | 4/2009 | Manning et al. |
| 2009/0209349 A1 | 8/2009 | Padhye et al. |
| 2009/0239650 A1 | 9/2009 | Alderucci et al. |
| 2009/0239668 A1 | 9/2009 | Han |
| 2010/0041482 A1 | 2/2010 | Kumar et al. |
| 2010/0124971 A1 | 5/2010 | Baerlocher et al. |
| 2010/0197405 A1 | 8/2010 | Douceur et al. |
| 2010/0273557 A1 | 10/2010 | Miyaki |
| 2010/0317420 A1 | 12/2010 | Hoffberg |
| 2011/0252079 A1 | 10/2011 | Werner et al. |
| 2011/0275432 A1 | 11/2011 | Lutnick et al. |
| 2012/0283021 A1 | 11/2012 | Riego |
| 2013/0023329 A1 | 1/2013 | Saunders |
| 2013/0045803 A1 | 2/2013 | Kang et al. |
| 2013/0132519 A1* | 5/2013 | Walsh ................ H04L 67/322 709/217 |
| 2013/0165234 A1 | 6/2013 | Hall et al. |
| 2013/0210527 A1 | 8/2013 | Kim et al. |
| 2013/0262203 A1 | 10/2013 | Frederick et al. |
| 2013/0288759 A1 | 10/2013 | Rom et al. |
| 2014/0189065 A1 | 7/2014 | van der Schaar et al. |
| 2014/0274402 A1 | 9/2014 | Michel et al. |
| 2015/0011310 A1 | 1/2015 | Lockton et al. |
| 2015/0038234 A1 | 2/2015 | Bojorquez et al. |
| 2015/0148127 A1 | 5/2015 | Saraf et al. |
| 2015/0375104 A1 | 12/2015 | Nishar et al. |
| 2016/0005270 A1 | 1/2016 | Marr et al. |
| 2016/0255139 A1 | 9/2016 | Rathod |
| 2016/0332081 A1 | 11/2016 | Marr et al. |
| 2017/0259178 A1 | 9/2017 | Aghdaie et al. |
| 2017/0291109 A1 | 10/2017 | Jensen |
| 2018/0065045 A1 | 3/2018 | Lebrun et al. |
| 2018/0111051 A1 | 4/2018 | Xue et al. |
| 2018/0369696 A1 | 12/2018 | Aghdaie et al. |
| 2019/0262718 A1 | 8/2019 | Xue et al. |
| 2019/0282907 A1 | 9/2019 | Jensen |

OTHER PUBLICATIONS

Agresti, A., et al., "Categorical Data Analysis." Springer, 2011.
Bell, C. E., Weighted matching with vertex weights: An application to scheduling training sessions in NASA space shuttle cockpit simulators. European Journal of Operational Research, 73(3):443-449, 1994.
Berge, C., "Hypergraphs: combinatorics of finite sets", vol. 45. Elsevier, 1984.
Bernhaupt, R., "User experience evaluation in entertainment. In Evaluating User Experience in Games", pp. 3-7. Springer, 2010.
Bradley, R. A., et al., "Rank analysis of incomplete block designs: I. The method of paired comparisons." Biometrika, 39(3/4):324-345, 1952.
Delalleau, E., et al., "Beyond Skill Rating: Advanced Matchmaking in Ghost Recon Online." IEEE Transactions on Computational Intelligence and AI in Games, 4(3):167-177, Sep. 2012.
Drake, D. E., et al., "A simple approximation algorithm for the weighted matching problem." Information Processing Letters, 85(4):211-213, 2003.
Duan, R., et al., "Linear-time approximation for maximum weight matching." Joural of the ACM (JACM), 61(1):1, 2014.
Edmonds, J., "Maximum matching and a polyhedrom with 0, 1-vertices." J. Res. Nat. Bur. Standards B, 69(1965):125-130, 1965.
Edmonds, J., "Paths, trees, and flowers." Canadian Journal of Mathematics, 17(3):449-467, 1965.
Elo, A. E., "The rating of chessplayers, past and present." Arco Pub., 1978.
Ferreira, J., et al., "Data mining techniquques on the evaluation of wireless churn." In ESANN, pp. 483-488, 2004.
Gabow, H. N., "Implementation of algoritms for maximum matching on nonbipratite graphs." 1974.
Gabow, H. N., "A scaling algoritm for weighted matching on general graphs." In Foundations of Computer Science, 1985., 26the Annual Symposium on, pp. 90-100, IEEE, 1985.
Glickman, M. E., "Parameter estimation in large dynamic paired comparison experiments." Applied Statistics, pp. 377-394, 1999.
Grapel, T., et al., "Ranking and Matchmaking." Game Developer Magazine, 25:34, 2006.
Hadiji, F., et al., "Predicting player chrun in the wild." In 2014 IEEE Conference on Computational Intelligence and Games, pp. 1-8, IEEE, 2014.
Herbrich, R., et al., "Trueskill: A bayesian skill rating system." pp. 569-576. Advances in Neural Information Processing Systems, 2006.
Huang, T.-K., et al., A generalized Bradley-Terry model: From group competition to individual skill. In Advances in Neural Information Processing Systems, pp. 601-608, 2004.
Jimenez-Rodriguez, J., et al., Matchmaking and case-based recommendations. 2011.

(56) References Cited

OTHER PUBLICATIONS

Lawler, E. L., "Combinatorial Optimization: Networks and Matroids." Courier Corporation, 2001. (Part 1 of 2).

Lawler, E. L., "Combinatorial Optimization: Networks and Matroids." Courier Corporation, 2001. (Part 2 of 2).

Lee, Y., et al., "Measurement and estimation of network QoS among peer Xbox 360 game players." In International Conference on Passive and Active Network Measurement, pp. 41-50. Springer, 2008.

Manweiler, S., et al., "Switchboard: a matchmaking system for multiplayer mobile games." In Proceedings of the 9th international conference on Mobile systems, applications, and services, pp. 71-84. ACM, 2011.

Menke, J. E., et al., "A Bradley-Terry artificial neural network model for individual ratings in gropu competitions." Neural computing and Applications, 17(2): 175-186, 2008.

Minotti, M., Comparing MOBAs: League of Legends vs. Dota 2 vs. Smite vs. Heroes of the Storm. Http://venturebeat.com/2015/07/15/comparing-mobas-league-of-legends-vs-dota-2-vs-smite-vs-heroes-of-the-storm/, 2016. Online; accessed May 2016.

Morik, K., et al., "Analysing customer churn in insurance date—a case study." In European Conferecne on Principles of Data Mining and Knowledge Discovery, pp. 325-336. Springer, 2004.

Myslak. M., et al., "Developing game-structure sensitive matchmaking system for massive-multiplayer online games." In Social Informatics, pp. 200-208. Springer, 2014.

Nguyen, T.-H. D., et al., "Analytics-based AI Techniques for Better Gaming Experience", vol. 2 of Game AI Pro. CRC Press, Boca Raton, Florida, 2015.

Olafsson, S., "Weighted matching in chess tournaments." Journal of the Operational Research Society, 41(1): 17-24, 1990.

Osiakwan, C. N., et al., "The maximum weight perfect matching problem for complete weighted graphs is in pc." In Parallel and Distributed Processing. 1990. Proceedings of the Second IEEE Symposium on, pp. 880-887. IEEE, 1990.

Riskin, E. A., et al., Index assignment for progressive transmission of full-search vector quantization. IEEE Transactions on Image Processing, 3(3):307-312, 1994.

Runge, J., et al., "Churn prediction for high-value players in casual social games." In 2014 IEEE Conference on Computational Intelligence and Games, pp. 1-8, IEEE, 2014.

SuperData. eSports market brief: US accounts for almost half of total viewership. https://www.superdataresearch.com/blog/esports-brief/, 2016. Online; accessed Mar. 2016.

Tassi, P., Riot's League of Legends Reveals Astonishing 27 Million Daily Players, 67 Million Monthly. Http://www.forbes.com/sites/insertcoin/2014/01/27/riots-league-of-legends-reveals-astonishing-27-million-daily-players-67-million-monthly/#26ff8e543511, 2016. Online; accessed May 2016.

Van Rantwijk, J., "Maximum Weighted Matching." http://jorisvr.nl/article/maximum-matching, 2013. Online; accessed May 2016.

Weber, B. G., et al., Modeling player retention in madden nfl 11. In IAAI. 2011.

Yannakakis, G., et al., Player Modeling. In Artificial and Computational Intelligence in Games, pp. 45-59. 2013.

Yoon, S., et al., Prediction of advertiser churn for google adwords. 2010.

Lee et al; Adaptive Server Selection for Large Scale Interfactive Online Games. ACM Press, 2004.

International Search Report Application PCT/US/06/18957 dated Aug. 17, 2007.

\* cited by examiner

NETWORK CONNECTION SELECTION PROCESSING SYSTEM

BACKGROUND

Video games have become a popular entertainment medium. Some video games are multiplayer games. There are a number of different methods that exist to enable users to play these multiplayer video games with each other. Often, the method used depends on the particular video game and the needs associated therefrom. For example, first person shooter (FPS) games may use peer-to-peer connections. However, massively multiplayer online role-playing games (MMORPG) with persistent worlds may require users to connect via a host system.

Often, users playing a multiplayer video game will experience connection losses and/or experience levels of latency that interfere with enjoyment of the video game. Consequently, a user experiencing such issues may be likely to play the game less over time compared to video games that do not suffer multiplayer connection issues. Thus, one of the challenges of video game development is to design a system that will keep a user connected when playing the video game.

SUMMARY OF DISCLOSURE

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

In certain embodiments, a computer-implemented method is disclosed that may be implemented by an interactive computing system configured with specific computer-executable instructions. The method may include receiving a first request from a first user computing system to play an instance of a video game. Further, the method may include obtaining first connection information for establishing a peer-to-peer connection with the first user computing system. Additionally, the method may include receiving a second request from a second user computing system to play the instance of the video game. Moreover, the method may include obtaining second connection information for establishing the peer-to-peer connection with the second user computing system. Furthermore, the method may include providing the first connection information to the second user computing system and the second connection information to the first user computing system enabling the first user computing system and the second user computing system to establish the peer-to-peer connection with each other. In addition, the method may include determining whether the first user computing system or the second user computing system successfully established the peer-to-peer connection. In response to determining that the first user computing system or the second user computing system did not successfully establish the peer-to-peer connection, the method may further include obtaining proxy connection information for connecting to a communication processing server, and providing the proxy connection information to the first user computing system and the second user computing system enabling the first user computing system and the second user computing system to establish a communication connection with each other via the communication processing server.

In other embodiments, a system is disclosed that comprises an electronic data store configured to store connection information for a plurality of communication processing servers and a hardware processor in communication with the electronic data store. The hardware processor may be configured to execute specific computer-executable instructions to at least receive an identity of a plurality of user computing systems selected to host a multiplayer instance of a video game. Further, the system may obtain connection information for each user computing system from the plurality of user computing systems. In addition, the system can provide each user computing system from the plurality of user computing systems with the connection information for each of the other user computing systems from the plurality of user computing systems. Furthermore, the system can determine whether each user computing system from the plurality of user computing systems successfully established a peer-to-peer connection with each of the other user computing systems from the plurality of user computing systems. In response to determining that a first user computing system from the plurality of user computing systems failed to establish a peer-to-peer connection with a second user computing system from the plurality of user computing systems, the system can obtain, from the electronic data store, connection information for a communication processing server from the plurality of communication processing servers. Moreover, the system can provide the connection information for the communication processing server to the first user computing system.

Yet other embodiments disclosed herein relate to a non-transitory computer-readable storage medium storing computer executable instructions that, when executed by one or more computing devices, configure the one or more computing devices to perform operations comprising selecting a plurality of users to play a multiplayer instance of a video game. Each user from the plurality of users may be associated with a different user computing system from a plurality of user computer systems. Further, the number of user computing systems in the plurality of user computer systems may be equal to the number of users in the plurality of users. In addition, the operations may include obtaining connection information for each user computing system from the plurality of user computing systems. Further, the operations may include providing each user computing system from the plurality of user computing systems with the connection information for each of the other user computing systems from the plurality of user computing systems. Moreover, the operations may include determining whether each user computing system from the plurality of user computing systems successfully established a peer-to-peer connection with each of the other user computing systems from the plurality of user computing systems. In response to determining that a first user computing system from the plurality of user computing systems failed to establish a peer-to-peer connection with a second user computing system from the plurality of user computing systems, the operations may include obtaining connection information for a communication processing server and providing the connection information for the communication processing server to the first user computing system.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements.

The drawings are provided to illustrate embodiments of the subject matter described herein and not to limit the scope thereof.

DETAILED DESCRIPTION

Introduction

Figure 1:
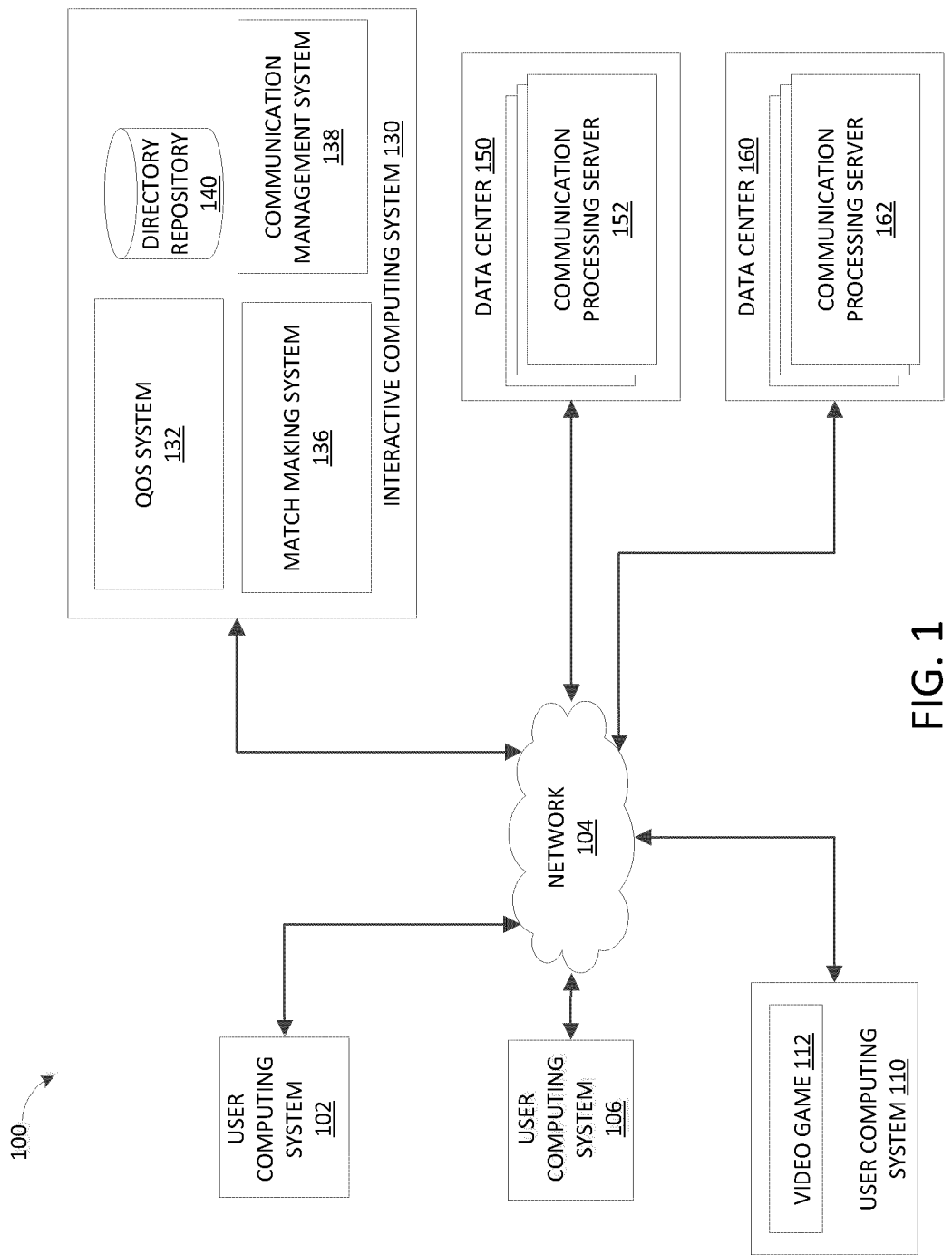
FIG. 1 illustrates an embodiment of a networked computing environment that can implement one or more embodiments of a communication management system.

Multiplayer video games have become more important to the video game industry. Different communication technologies may be used to connect multiple users together who desire to play a video game with each other. One such communication technology is sometimes referred to as peer-to-peer communication. Some video games may use direct peer-to-peer connections to connect users who desire to play an instance of a video game together. A peer-to-peer connection may enable computer systems of two users to communicate with each other directly or via one or more intermediary computer systems that facilitate communication via, for example, packet forwarding. By establishing multiple peer-to-peer connections, it is possible for more than two computer systems to communicate with each other. For example, a peer-to-peer connection may be established for each pair of computer systems from three or more computer systems.

Sometimes, a computer system may fail to connect with another computing system when using peer-to-peer communication. One of the reasons for this connection failure relates to network address translation (NAT) interoperability. In many cases, one or more devices of a user or an entity may be connected to a network (for example, the Internet) via a router. Often, the router will include a firewall and/or one or more connection policies or filters that restrict the flow of data packets between the internal network that includes the devices of the user or entity and an external network that is not controlled by the user, such as the Internet. Further, when user computing devices of the internal network, such as a video game console, computer system, laptop, or smartphone, are connected to a router, a private internal network address may be assigned to the devices. When the internal devices attempt to communicate to an external network, the internal network address may be translated to a single Internet Protocol address that is shared by multiple devices from the internal network and that is controlled by the router. The various firewalls, filters, and address translation mechanisms used by different routers may result in connection issues that prevent a peer-to-peer connection from being established with another computer system Connection failure is not the only issue that may arise when using peer-to-peer communication to play a multi-player video game. Another example of a problem is poor quality of service ("QoS"), which may occur when a user computing system successfully connects to another user computing system, but the latency or data rate affects the quality of a user's play experience. A poor data rate may occur when the number of packets that are dropped or fail to reach their destination exceeds a threshold. Further, poor latency may occur when the amount of time for a data packet to travel between two peer computer systems exceeds a threshold. A number of factors may influence the QoS between two peer computer systems, such as the geographic region where one or more of the peers are located and the time or day of the year. Further, the configurations and requirements of the video game itself may determine how impactful the poor QoS is for the particular video game.

Embodiments presented herein include a system and method for dynamically selecting a communication technology based at least in part on the success in forming a peer-to-peer connection for playing an instance of a video game. In some cases, systems and methods presented herein may dynamically select a communication technology based on the quality of service of an established communication connection between two or more computing systems corresponding to two or more users attempting to play the instance of the video game. Certain embodiments described herein enable two or more user computing systems to transition from a peer-to-peer connection to a host-based or server-based communication session using, for example, a communication processing server that can process data and/or relay video game data between the computer systems of two or more users. In some such embodiments, the communication processing server may serve as communication proxy that can receive commands, game data, and/or game state information from one instance of a video game at one user computing system and forward the commands, game data and/or game state information to another instance of the video game at another user computing system. In certain embodiments, the type of communication connection established between the user computer systems and/or the transition between communication technologies used may be transparent to the users. Thus, in some cases, the users who are playing the video game may not know the type of connection established for playing the multiplayer video game.

Advantageously, in certain embodiments, by switching the communication connection from a peer-to-peer connection to a host or server-based connection, the previously described problems related to NAT interoperability QoS may be reduced. Moreover, in certain embodiments, the previously described problems related to NAT interoperability may be eliminated. Further, by attempting to establish a peer-to-peer connection before transitioning to a host or server-based communication connection, the amount of resources allocated for host or server-based communication may be reduced. For example, instead of maintaining 5,000 servers for a particular video game, it may be possible to maintain 1,000 servers for the particular video game while supporting the same number of users over time. It may be possible to reduce the number of servers because, for example, a majority of instances of the multiplayer video game may be played with a peer-to-peer connection. However, by enabling a transition from a peer-to-peer connection to a server-based connection, users whose user computing systems fail to establish a peer-to-peer connection or whose connections have a below-threshold QoS may play the multiplayer video game without experiencing some of the previously described problems.

In certain embodiments, systems disclosed herein include a system and method for establishing communication between a plurality of instances of a video game located at a plurality of user computing systems using a server, such as a communication processing server, to process or manage communication between the instances of the video game from the plurality of instances of the video game. In some such embodiments, the system may automatically attempt to establish communication using the communication processing server without attempting peer-to-peer communication. In some embodiments, by attempting to establish communication via a communication processing server without attempting peer-to-peer communication, the percentage of successfully established communication connections may be increased compared to systems that use peer-to-peer communication. However, the amount of computing resources allocated to a video game that uses the communication processing server for multiplayer game play may be greater than video games that enable peer-to-peer communication. Further, in some cases, the QoS of at least some of the communication connections via the communication processing server may be reduced compared to systems that use peer-to-peer communication. However, in some other cases, the QoS of at least some of the communication connections via the communication processing server may be improved compared to systems that use peer-to-peer communication.

In certain embodiments, the system attempts peer-to-peer communication between instances of a video game hosted by at least two user computing systems. When the peer-to-peer communication is successfully established or established with a threshold QoS level, the instances of the video game may communicate over the peer-to-peer connection. A connection may be successfully established between two user computing systems when the two user computing systems can communicate with each other and/or communicate with each other within a threshold QoS value. In some cases, a peer-to-peer connection may be successfully established when a user computing system establishing the peer-to-peer connection receives an acknowledgement packet and/or a connection successfully established flag from the user computing system that the connection is with. When the peer-to-peer communication is unsuccessfully established or established with a below threshold QoS level, the system may use the communication processing server to establish communication between instances of the video game hosted at different user computing systems. Advantageously, in certain embodiments, by dynamically selecting whether to communicate via a peer-to-peer connection or via a communication processing server, the amount of computing resources allocated for a particular video game title may be reduced while supporting at least the same number of users who desire to play the video game.

As used herein, the term "video game title" may refer to a particular video game, which may have any number of copies or instances hosted by any number of computing systems. For example, the video game title "FPS One" may refer to a particular first person shooter video game that can have thousands or millions of separate copies or instances installed or hosted by thousands or millions of user computing systems.

In certain embodiments disclosed herein, a system may select the best mode of communication by establishing communication between a pair of user computing systems using both peer-to-peer communication and a server or proxy-based communication using the communication processing server. The system may measure one or more QoS characteristics of the established connections, such as latency or bandwidth, and select the connection that provides better QoS characteristics. In some cases, the system may select the peer-to-peer connection unless the server or proxy-based communication connection provides a threshold QoS improvement compared to the peer-to-peer connection.

To simplify discussion, the present disclosure is primarily described with respect to a video game. However, the present disclosure is not limited as such and may be applied to other types of applications. For example, embodiments disclosed herein may be applied to educational applications or other applications that may connect a plurality of users over a network.

Example Networked Computing Environment

FIG. 1 illustrates an embodiment of a networked computing environment 100 that can implement one or more embodiments of a multiplayer connection system. The networked computing environment 100 includes a user computing system 110 that can communicate with an interactive computing system 130 via a network 104. Further, the networked computing environment 100 may include a number of additional user computing systems 102 and 106. At least some of the user computing systems 102 and 104 may be configured the same as or similarly to the user computing system 110. It should be understood that the networked computing environment 100 may include any number of other user computing systems that can implement at least some of the embodiments described herein.

The user computing system 110 may include or host a video game 112. In some cases, the video game 112 may execute entirely on the user computing system 110. In other cases, the video game 112 may execute at least partially on the user computing system 110 and at least partially on the interactive computing system 130. In some cases, the video game 112 may execute entirely on the interactive computing system 130, but a user may interact with the video game 112 via the user computing system 110. For example, the game may be a massively multiplayer online role-playing game (MMORPG) that includes a client portion executed by the user computing system 110 and a server portion executed by one or more application host systems (not shown) that may be included as part of the interactive computing system 130. As another example, the video game 112 may be an adventure game or a first person shooter (FPS) played on the user computing system 110 without interacting with the interactive computing system 130.

The user computing system 110 may include hardware and software components for establishing communications over a communication network 104. For example, the user computing system 110 may be equipped with networking equipment and network software applications (for example, a web browser) that facilitate communications via a network (for example, the Internet) or an intranet. The user computing system 110 may have varied local computing resources, such as central processing units and architectures, memory, mass storage, graphics processing units, communication network availability and bandwidth, and so forth. Further, the user computing system 110 may include any type of computing system. For example, the user computing system 110 may include any type of computing device(s), such as desktops, laptops, video game platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the user computing system 110 may include one or more of the embodiments described below with respect to FIG. 7 and FIG. 8.

As previously discussed, certain video games may be configured to establish peer-to-peer connections between user computing systems, such as the user computing system 110 and the user computing system 102, to enable users to play a multiplayer instance of the video games. However, as discussed above, it may sometimes be desirable to switch or transition the connection from a peer-to-peer connection to a host or server-based connection that uses a communication processing server 152 or 162 of a data center 150 or 160, respectively. The communication processing servers 152, 162 may include one or more computing systems or resources that can facilitate communication between multiple user computing systems to enable a multiplayer instance of the video game 112. In some cases, the communication processing servers 152, 162 may be or may include one or more proxy servers. Further, in some cases, the communication processing servers 152, 162 may host at least a portion of the video game 112.

The interactive computing system 130 may include a number of systems or subsystems for facilitating the connection of a plurality of user computing systems to enable a plurality of users to play a multiplayer instance of the video game 112. These systems or subsystems can include a Quality of Service (QoS) system 132, a match making system 136, a communication management system 138, and a directory repository 140. Each of these systems may be implemented in hardware, software, or a combination of hardware and software. Further, each of these systems may be implemented in a single computing system comprising computer hardware or in one or more separate or distributed computing systems. Moreover, while these systems are shown in FIG. 1 to be stored or executed on the interactive computing system 130, it is recognized that in some embodiments, some or all of these systems may be separate computing systems. Further, in some cases, at least some of the systems may be stored and/or executed on the user computing system 110.

The match making system 136 can match a user with one or more other users that desire to play an instance of the video game 112. The users may be matches as teammates, opponents, or a combination of teammates and opponents. The match making system 136 may access a queue of users that have indicated a desire to play the video game 112. Further, the match making system 136 may use one or more selection algorithms to select a plurality of users to play an instance of the video game 112.

The communication management system 138 may provide connection information to the user computing systems associated with the users who are selected to play an instance of the video game 112 together. This connection information may include any type of information that can facilitate the user computing systems establishing a peer-to-peer connection with each other. For example, the connection information may include an internet protocol (IP) address, a port number, and/or an access code. Further, the connection may be established over any type of network, including, but not limited to, the Internet. Thus, in some embodiments, the connection information may be provided for an Internet Protocol version 4 (IPv4) network, an Internet Protocol version 6 (IPv6) network, or any other type of communication network.

Furthermore, although primarily described with respect to personal computer systems, it should be understood that embodiments disclosed herein may be used with any type of user computing system including, for example, video game consoles. Some video game consoles may obfuscate or otherwise encrypt or hide connection information using a security layer that may use encrypted communication. In some such cases, connection information exchanged between the user computing systems and/or the video game consoles may use platform-specific secure addresses that may only be used or understood by the security layer. The security layer may then device the IP address from the secure addresses. In some embodiments, the communication management system 138 may implement a version of the security layer enabling the communication management system 138 to communicate with the video game consoles that implement the security layer. Further, the communication management system 138 can determine how to communicate with the user computing system based at least in part on the type of user computing system as may be determined from identification information obtained from the user computing system. Thus, the communication management system 138 can facilitate communication between heterogeneous communication systems by providing communication information in a format understood by each type of user computing system being used to play a shared play session of the video game.

Further, the communication management system 138 may facilitate establishing a connection between a plurality of user computing systems and a communication processing server 152, 162. The communication system 138 may establish the connection between the plurality of user computing systems and the communication processing server 152, 162 if the plurality of user computing systems are unsuccessful in establishing a peer-to-peer communication session and/or if the quality of service of an established peer-to-peer connection fails to satisfy a threshold level. In some cases, the communication management system 138 may provide one or more user computing systems with connection information to enable the one or more user computing systems to establish a communication connection with a communication processing server 152,162. The communication processing server 152, 162 can forward data between the user computing systems to enable play of the instance of the video game 112. In certain embodiments, some of the user computing systems may communicate using a peer-to-peer connection while some other of the user computing systems may communicate via one or more communication processing servers 152, 162.

The data centers 150 and 160 are typically physical locations that may include a number of computing resources that may be accessed by a plurality of users. For example, the data centers 150, 160 may include one or more host systems (not shown) for hosting at least a portion of copies of the video game 112. As illustrated in FIG. 1, the data centers 150, 160 include one or more communication processing servers 152, 162, respectively. The communication processing servers 152, 162 may facilitate multiplayer gameplay by forming a connection or link between at least a pair of user computing systems. The connection enables local copies of the video game 112 located on the user computing systems to pass data and/or control information between the respective copies of the video game 112 located on the connected user computing systems. In some cases, the communication processing servers 152, 162 may function as proxy systems. Alternatively, or in addition, the communication processing servers 152, 162 may process or perform one or more actions on data or controls received from one or more user computing systems 110 before providing the data or the controls to one or more other user computing systems 106. For example, the communication processing server 152 may receive a plurality of data packets from several user computing systems 102, 106, and 110. The communication processing server 152 may aggregate data from the plurality of data packets and provided the aggregated data via modified data packets to the user computing systems 102, 106, and 110. Advantageously, in certain embodiments, by aggregating data packets, the communication processing server 152 may improve performance of the connection between the user computing systems, and/or performance of the video game 112.

The data centers 150, 160 may be collocated. Alternatively, or in addition, at least some of the data centers 150, 160 may be disparately located. For example, a data center 150 may be located in one geographic region, such as the United States of America, and another data center 160 may be located in another geographic region, such as the United Kingdom. As another example, a data center 150 may be located in California and another data center 160 may be located in New Jersey. Although depicted separately from the interactive computing system 130, in some embodiments, one or more instances of the interactive computing system 130 may be included by one or more of the data centers 150, 160.

The QoS system 132 determines the quality of service for a communication connection between two or more user computing systems. The QoS system 132 can determine the QoS between the user computing systems in a peer-to-peer connection and/or through a connection established via a communication processing server 152. Although illustrated as part of the interactive computing system 130, the QoS system 132, at least in part, can be located in a data center 150, in a communication processing server 152, at a user computing systems, or in other locations in the networked communication environment 100. The QoS system 132 can determine a QoS value based at least in part on several communication metrics. For example, the QoS value may be based at least in part on a latency value, an available bandwidth, or an amount of packet loss between a user computing system and another user computing system and/or a communication processing server 152, 162.

As previously described, a communication management system 138 can provide a set of user computing systems with connection information to enable the set of user computing systems to establish peer-to-peer communication with each other. In some cases, a full peer-to-peer mesh may be created with each user computing system establishing a peer-to-peer communication with each other user computing system. Often, although not necessarily, one of the user computing systems may serve as a master user computing system and may be responsible for managing, at least in part, the peer-to-peer connections and/or communication between the user computing systems. In some such cases, the master user computing system may serve as a form of host for the instance of the video game 112. In some instances, one or more of the user computing systems may fail to establish a peer-to-peer connection, or may be associated with a peer-to-peer connection with a below threshold level QoS value. In some such cases, peer-to-peer connections may be established with some of the user computing systems and the other user computing systems may establish communication via a communication processing server 152, 162.

In some embodiments, the QoS threshold may vary based on the number of available communication processing servers 152, 162. For example, if less than 10% of the communication processing servers are available, the QoS threshold may be lower than if 90% of the communication processing servers are available. In other embodiments, the number of available communication processing servers 152, 162 does not impact the QoS threshold. Further, in some embodiments, the particular video game or the type of video game may impact the QoS threshold. In certain embodiments, such as when no user computing systems can establish a peer-to-peer connection or when less than a threshold percentage or number of user computing systems are able to establish a peer-to-peer connection, each of the user computing systems may establish a connection with a communication processing server 152, 162.

In certain embodiments, the communication management systems 138 can determine whether to transition from using peer-to-peer communication between two or more user computing systems or to use one of the communication processing servers 152, 162 to establish a communication connection between the two or more user computing systems by monitoring the communication state and/or QoS of communication between the two of more user computing systems. In some cases, the monitoring of the communication state or QoS is performed by one or more of the match making systems 136 or the QoS system 132. In some cases, the determination of whether to transition from peer-to-peer communication to a server or host-based communication may be based at least in part the availability of communication processing servers, user profiles, user connectivity history, and geolocation of the users.

As previously stated, in some cases, some connections between user computing systems may be peer-to-peer while some connections may use alternative communication techniques or technologies. In one example use case, there are three bi-directional connections established for playing an instance of a video game: player 1 ("P1") connected with player 2 ("P2"), P2 connected with player 3 ("P3"), and P3 connected with P1. If one of the connections fails, the communication management system 138 can switch the failed peer-to-peer connection to a host or proxy-based communication through a communication processing server 152. In such a case, a user computing system may have a peer-to-peer connection with another user computing system and a proxy or host-based connection with one other user computing system. Similarly, if two of the connections fail, the communication management system 138 can transition two of the three connections from peer-to-peer to a proxy-based communication. If each of the peer-to-peer connections fails, each of the connections may be established via the communication processing server 152, 162.

Although many of the embodiments described herein relate to switching from peer-to-peer communication to proxy or host-based communication, a number of the embodiments can be adapted to perform the opposite process. However, to simplify discussion and not to limit the present disclosure, much of this application describes transitioning from a peer-to-peer connection to a hosted or proxy connection.

The directory repository 140 can store connection data relating to the communication processing servers 152, 162. The connection data can include data that may be provided to a user computing system 110 to enable the user computing system 110 to establish a connection with the communication processing server 152, 162. Further, in some cases, the communication processing servers 152, 162 may be divided into deployment pools. These deployment pools may be based on the video game. In some cases, each video game title may be associated with a different deployment pool. For example, FPS video game 1 may be associated with a first deployment pool, FPS video game 2 may be associated with a second deployment pool, and sports video game 1 may be associated with a third deployment pool. The directory repository 140 may store information relating to the deployment pools including the video game title associated with each deployment pool and the identity of the communication processing servers included in each deployment pool. Further, the directory repository 140 may store availability information for establishing communication connections with each of the communication processing servers. The directory repository 140 can also store information with respect to the data centers 150, 160, such as location information and availability information for computing systems (such as the communication processing servers) within the data centers. In addition, the directory repository may store information relating to the user computing systems 110, such as, for example, geolocation information, or communication bandwidth information. Advantageously, in certain embodiments, by storing location information for the data center, a communication processing server may be selected based on its location with respect to a user computing system 110.

The network 104 can include any type of communication network. For example, the network 104 can include one or more of a wide area network (WAN), a local area network (LAN), a cellular network, an ad hoc network, a satellite network, a wired network, a wireless network, and so forth. Further, in some cases, the network 104 can include the Internet. The network 104 can be a collection of networks, which may include, for example, a plurality of wired and wireless networks, asynchronous transfer mode (ATM) networks, or cellular networks, and the like.

Example Multiplayer Connection Process

Figure 2:
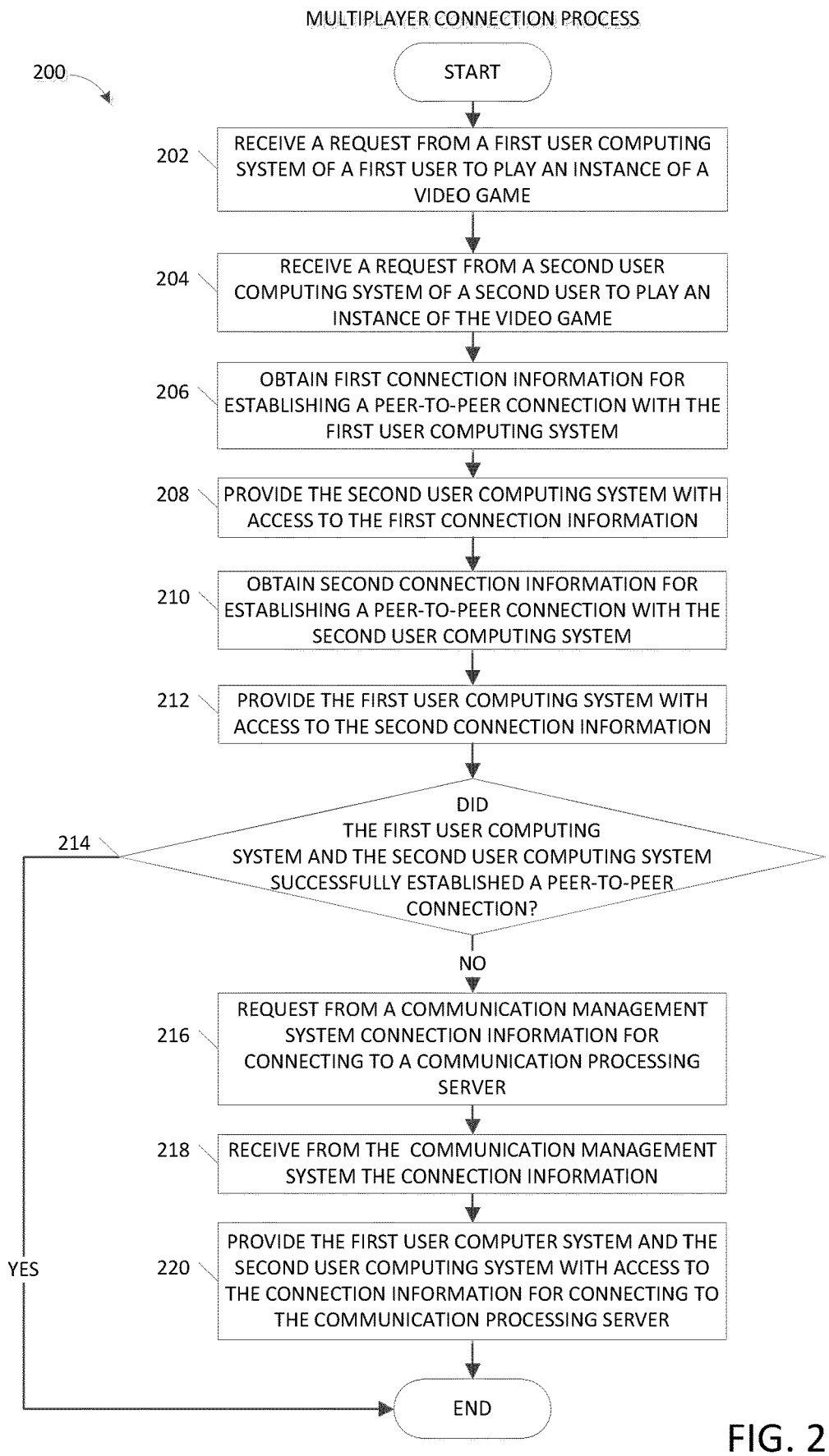
FIG. 2 presents a flowchart of an embodiment of a multiplayer connection process.

FIG. 2 presents a flowchart of an embodiment of a multiplayer connection process 200. The process 200 can be implemented by any system that can provide access to connection information for enabling at least two user computing systems to establish a communication connection for playing a multiplayer video game. The process 200, in whole or in part, can be implemented by, for example, an interactive computing system 130, a QoS system 132, a match making system 146, a communication management system 138, or a user computing system 102, 106, 110, among others. Although any number of systems, in whole or in part, can implement the process 200, to simplify discussion, the process 200 will be described with respect to particular systems.

The process 200 begins at block 202 where the match making system 136 receives a request from a first user computing system 110 of a first user to play an instance of a video game 112.

At block 204 of FIG. 2, the match making system 136 receives a request from a second user computing system, such as the user computing system 102 of a second user to play an instance of the video game 112. In some cases, the first and second user may request to play in the same instance of the video game. Alternatively, the first user and the second user may be matched by a match making algorithm performed by the match making system 136. For example, the match making system 136 may match the first user and the second user to play an instance of the video game 112 together based at least in part on the skill levels associated with the first and second user and the positon within a queue of users waiting to play an instance of the video game 112.

At block 206, the match making system 136 obtains first connection information for establishing a peer-to-peer connection with the first user computing system. Alternatively, or in addition, the first connection information may be obtained by the communication management system 138. In some embodiments, the first connection information is obtained by querying the first user and/or the user computing system 110 associated with the first user. Further, at least some of the first connection information may be obtained from the directory repository 140. For example, during a registration process, connection information associated with an account of the first user may be obtained and stored at the directory repository 140. This information may be accessed as part of the operations associated with the block 206. In some embodiments, the first connection information may be included as part of the operations of the block 202. In some such cases, the block 206 may be optional or omitted. The first connection information may include information that facilitates another computing system establishing a connection with the first user computing system. For example, the first connection information may include a unique system identifier, such as an IP address, a port identifier, a one-time password or access code, a multi-use password or access code, a user identifier associated with a user of the first computing system, and the like.

At block 208, the match making system 136 provides the second user computing system with access to the first connection information. Providing the second user computing system with access to the first connection information may include transmitting all or some of the first connection information to the second user computing system. In some cases, the transmitted first connection information is encrypted or otherwise protected. In some such cases, the first connection information may be accessible or readable by the video game 112 and/or the second user computing system, but inaccessible or unreadable by a user who accesses the second user computing system. Advantageously, in certain embodiments, by providing an encrypted version of the first connection information to the second user computing system, privacy of the first user may be maintained.

At block 210, the match making system 136 obtains second connection information for establishing a peer-to-peer connection with the second user computing system. In some embodiments, the block 210 may include one or more of the embodiments previously described with respect to the block 206. Further, at block 212, the match making system 136 provides the first user computing system with access to all or some of the second connection information. In some embodiments, the block 212 may include one or more of the embodiments previously described with respect to the block 208.

The first user computing system and the second user computing system may attempt to establish a communication connection with each other. For example, the first user computing system and the second user computing system may attempt to establish a peer-to-peer connection using the respective connection information that each device received from the match making system 136.

At decision block 214, the match making system 136 may determine whether the first user computing system and the second user computing system successfully established a peer-to-peer connection. A successfully established peer-to-peer connection may include a connection that enables an instance of the video game 112 on the first user computing system to communication with an instance of the video game 112 on the second user computing system via the peer-to-peer connection and vice versa. The determination of decision block 214 may be based at least in part on a confirmation or acknowledgement message received from one or both of the user computing systems. Alternatively, or in addition, the determination at decision block 214 may be based at least in part on the match making system 136 querying or pinging one or both of the user computing systems to confirm the establishment of the peer-to-peer connection between the first user computing system and the second user computing system.

Optionally, in some embodiments, the decision block 214 may include the QoS system 132 determining whether a QoS value associated with a successfully established peer-to-peer connection between the first user computing system and the second user computing system satisfies a QoS threshold. If the QoS value does not satisfy the QoS threshold, then the match making system 136 may determine that the peer-to-peer connection was not successfully established for the purposes of the process 200 regardless of whether a peer-to-peer connection was formed.

If it is determined at the decision block 214 that the peer-to-peer connection was successfully established, the process 200 may end or be completed. Optionally, in some cases, the process 200 may include continuing to monitor the peer-to-peer connection to determine whether the connection between the first user computing system and the second user computing system is lost or drops below a threshold QoS value.

If it is determined at the decision block 214 that the peer-to-peer connection was not successfully established, the match making system 136 requests, from the communication management system 138, connection information for connecting to a communication processing server at block 216. The communication processing server may include one of the communication processing servers 152, 162 located at one of the data centers 150, 160, respectively. This request may include information to facilitate the communication management system 138 selecting a communication processing server. For example, the information may include the identity of the video game 112, a type of the video game 112, a geographic location of one or more of the user computing systems, a number of user computing systems that are to connect to the communication processing server, a number of user computing systems that are to be used to play an instance of the video game 112, or any other information that may facilitate the selection of the communication processing server.

At block 218, the match making system 136 receives from the communication management system 138 the connection information for a communication processing server. In certain embodiments, the blocks 216 and/or 218 may include one or more of the embodiments described with respect to FIG. 3 below. The connection information, which may be referred to as proxy connection information, may include any type of information for facilitating a connection to the communication processing server, such as an IP address and/or an access password. At block 220, the match making system 136 provides the first user computing system and the second user computing system with access to the connection information for connecting to the communication processing server. The connection information typically, but not necessarily, will be provided to both the first and second user computing systems. In some embodiments, the first user computing system may receive different connection information than the second user computing system. For example, the first user computing system may receive connection information for connecting with the communication processing server 152 in data center 150 and the second user computing system may receive connection information for connecting with the communication processing server 162 in data center 160 or another communication processing server in data center 150. Further, in some cases, the communication processing server associated with the first user computing system can communicate with the communication processing server associated with the second user computing system. In some embodiments, the communication management system 138 may communicate the connection information to the first and second user computing systems without providing the connection information to the match making system 136. In such embodiments, the block 218 may be optional.

In certain embodiments, the decision block 214 may include determining whether the first user computing system successfully established a peer-to-peer connection with the second user computing system and whether the second user computing system successfully established a peer-to-peer connection with the first user computing system. In some cases, one of the user computing systems may be capable of receiving packets over the peer-to-peer connection, but not sending packets, or vice versa.

In some embodiments, when a number of user computing systems are attempting to establish a connection to play an instance of the video game, some of the user computing systems may successfully establish peer-to-peer connections and some may not. In some such embodiments, the user computing systems that successfully established peer-to-peer connections may communicate using the peer-to-peer connections while the remaining user computing systems may communicate using a communication connection or communication channel established via the communication processing server. Thus, in some cases, multiple communication technologies or methods may be used during a multiplayer instance of the video game.

Example Communication Processing Server Identification Process

Figure 3:
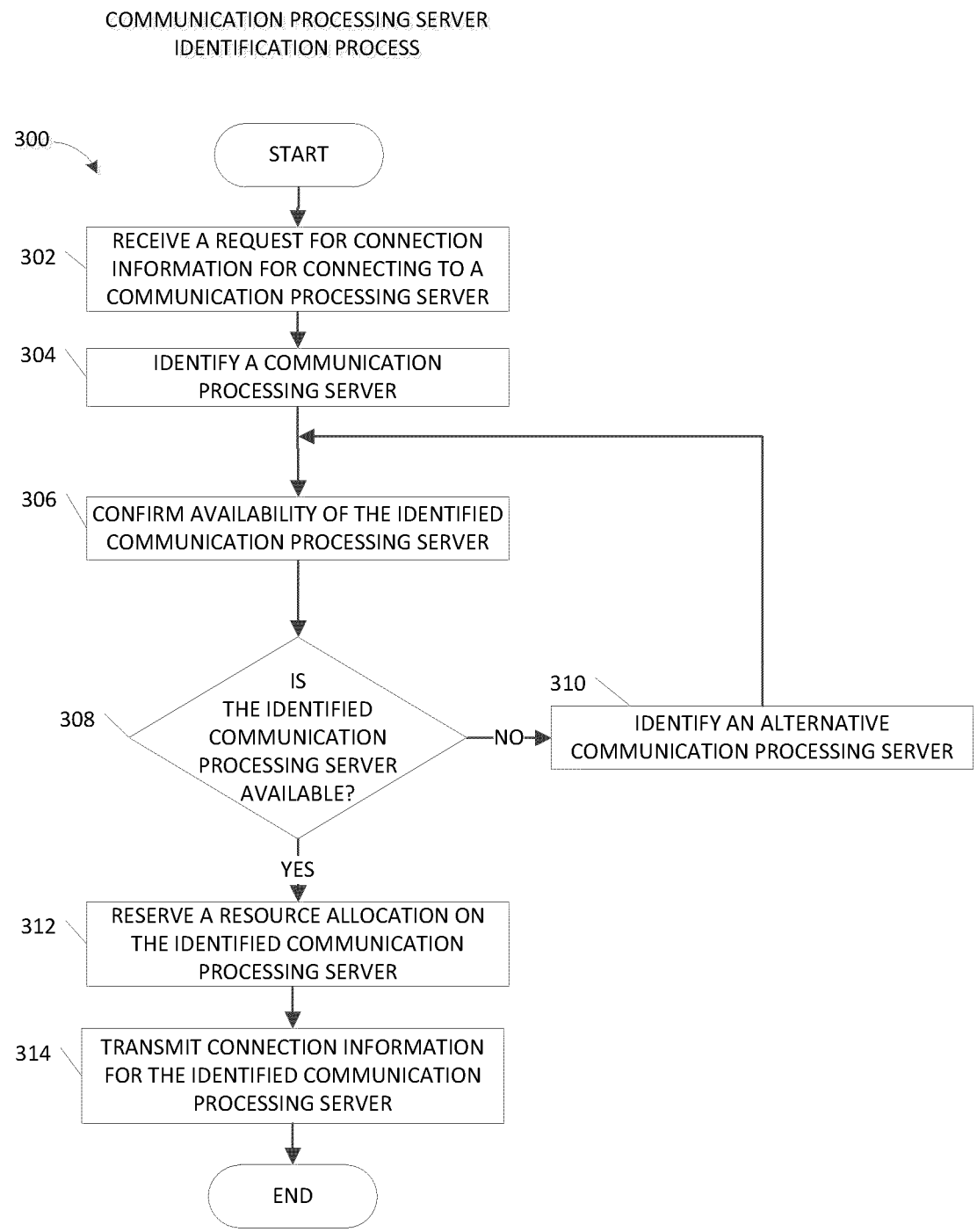
FIG. 3 presents a flowchart of an embodiment of a communication processing server identification process.

FIG. 3 illustrates a flowchart of an embodiment of a communication processing server identification process 300. The process 300 can be implemented by any system that can confirm the availability of a communication processing server and/or reserve a connection resource allocation at the communication processing server. The process 300, in whole or in part, can be implemented by, for example, an interactive computing system 130, a QoS system 132, a match making system 146, a communication management system 138, or a user computing system 102, 106, 110, among others. Although any number of systems, in whole or in part, can implement the process 300, to simplify discussion, the process 300 will be described with respect to particular systems.

The process 300 begins at block 302 where the communication management system 138 receives a request for connection information for connecting to a communication processing server, such as a communication processing server 152. The request for the connection information may be received from the match making system 136. In some cases, the request for the connection information may be received from a user computing system, such as the user computing system 110. In some embodiments, the request includes one or more pieces of information or data that may facilitate the selection of a communication processing server. The information may include, for example, an identity of the video game, an identity of a deployment pool (which may be based on the identity of the video game and may include a set of communication processing servers allocated to the video game), an identification of a data center, a number of connections requested, a number of user computing systems to connect via the communication processing server, a connection protocol version to be used to connect one or more user computing systems via the communication processing server, or the like.

At block 304, the communication management system 138 may identify a communication processing server. The communication processing server may be identified by accessing metadata associated with the communication processing servers 152, 162 from the directory repository 140. In some cases, the communication management system 138 may be a central authority for the directory repository 140 that creates, updates, stores, and/or extracts information about the communication processing servers 152, 162 across multiple data centers 150, 160. In some embodiments, the communication management system 138 may access some or all of the communication processing servers 152, 162 and select a communication processing server 152, 162 based at least in part on a selection algorithm performed by the communication management system 138. The selection algorithm may be based on one or more factors that can affect the connectivity of the user computing systems with the selected communication processing server. For example, the factors may include the geolocation of the data centers 150, 160, the geolocation of the user computing systems that are to communicate via the selected communication processing server, the communication protocols used by the user computing systems, and/or an anticipated rate of requests for resources from the selected communication processing server.

In some embodiments, the communication processing server may be selected based at least in part on the information included with the request at the block 302. For example, the communication processing server may be selected based on a connection protocol version and an identified deployment pool. As mentioned above, the deployment pool may be based on an identity of the video game to be played by the users. In some cases, each video game may be associated with a different set of communication processing servers that can be grouped into a deployment pool for the video game. The deployment pool for a particular video game may be located at a particular data center or may be distributed among multiple data centers. In the latter case, the selection of the data center may be based at least in part on a location of one or more of the user computing systems to use or communicate via the communication processing server and/or the availability of resources for supporting some number of connections by a communication processing server at a particular data center. For example, suppose six connections to a communication processing server are requested. Further, suppose a data center that is on average geographically closer to the user computing systems that will connect to the communication processing server does not include a communication processing server with resources for supporting six connections available, a geographically farther data center may be selected, assuming it has a communication processing server than can support the requested number of connections.

At block 306, the communication management system 138 confirms the availability of the identified communication processing server. Confirming the availability of the identified communication processing server may include accessing a directory of communication processing servers at, for example, the directory repository 140. This directory of communication processing servers may include information relating to the amount of available resources, such as resources for managing a connection with one or more user computing systems, and information relating to reserved or unavailable resources. Alternatively, or in addition, the communication management system 138 may communicate with a management system at one or more of the data centers to determine the availability of communication processing servers at the data centers and/or within a deployment pool at the data centers. Further, in some embodiments, the communication management system 138 may communicate directly with one or more communication processing servers to determine the availability of resources at the one or more communication processing servers. As previously described, the resources generally relate to computing resources for establishing and managing connections between instances of the video game 112 at a plurality of user computing systems, such as network or connection-related resources. In some cases, the resources may include units or measures of memory reserved for establishing and managing the connection, units or measures of central processing unit (CPU) capacity consumed for each connection, and/or units or measures of network bandwidth consumed by each connection.

In some embodiments, the resources may also include computing resources that are unrelated to establishing and maintaining a connection between the user computing systems or that may be used to perform additional operations, such as CPU or GPU resources. For example, in some cases, the communication processing server 152 may help aggregate and/or average changes to game state based on communications received from a plurality of interconnected instances of the video game 112 hosted by a plurality of user computing devices. This plurality of interconnected instances of the video game 112 may be interconnected to enable a plurality of users to play the video game 112 together in a single match or instantiation of the game world. Further, as the communication server 152 performs some processing of the received changes to the game state before forwarding to the individual instance of the video game 112 included in the plurality of interconnected instances of the video game 112, a quantity of CPU resources may be allocated for the processing of the received changes to the game state. In some embodiments, confirming the availability of the identified communication processing server may include reserving, at least temporarily, an amount of resources that may be required for supporting or responding to the request received at the block 302.

At decision block 308, the communication management system 138 determines if the identified communication processing server is available. This availability determination may be based on the operations performed with respect to the block 306. In some embodiments, the processes associated with the block 306 and 308 may be combined. If it is determined at the decision block 308 that the identified communication processing server is unavailable and/or does not have enough resources available to support or fulfill the request received at block 302, the communication management system 138 identifies an alternative communication processing server at block 310. In certain embodiments, the block 310 may include one or more of the embodiments described with respect to the block 304.

If it is determined at the decision block 308 that the identified communication processing server is available, the communication management system 138 requests the identified communication processing server reserve one or more resource allocations at block 312 to fulfill the request received at block 302. The reserved resources may include any of the resources previously described with respect to the block 306. For example, a particular amount of memory space, CPU capacity, or network bandwidth may be reserved for the connection. In some cases, the reserved amount of resources may include a buffer to account for unexpected or unusual resource usage. At block 314, the communication management system 138 provides connection information for the identified communication processing server to the match making system 136. Alternatively, or in addition, the communication management system 138 may communicate the connection information to one or more user computing systems that are to communicate with one or more other user computing systems via the identified communication processing server. The connection information may include any type of information that may be used to enable a user computing system to establish a connection with the identified communication processing server and/or to use the identified communication processing server as a communication proxy for communicating with at least one other user computing system.

Example QoS-Based Multilayer Connection Process

Figure 4:
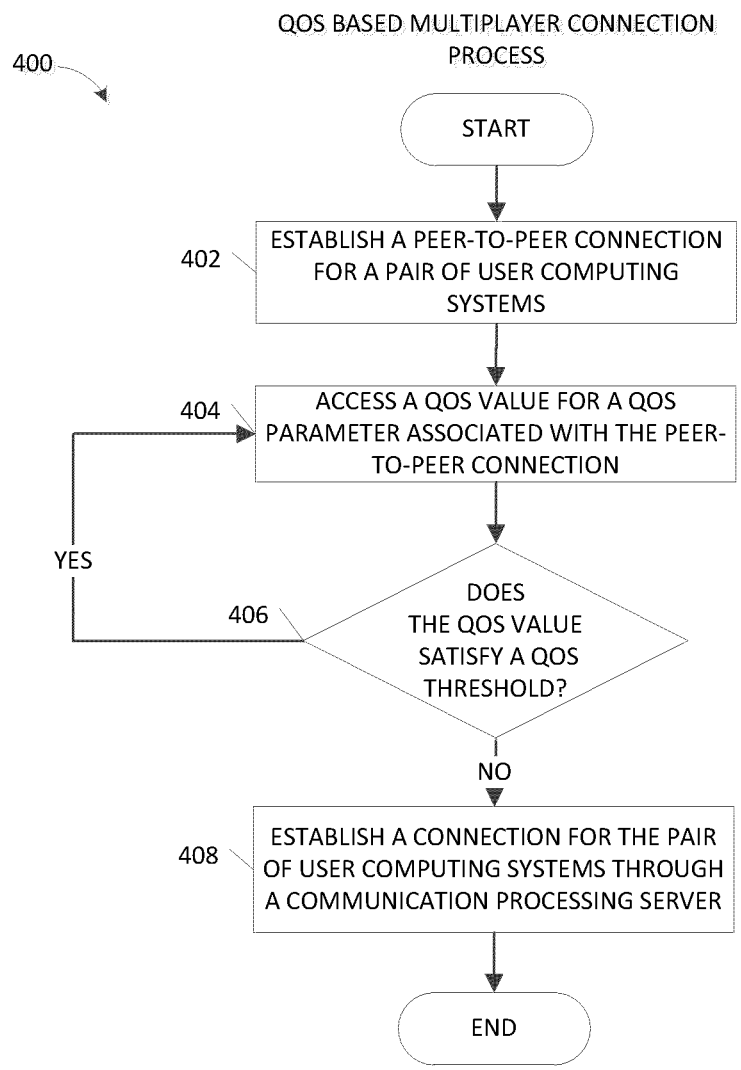
FIG. 4 presents a flowchart of an embodiment of a Quality of Service (QoS) based multiplayer connection process.

FIG. 4 shows a flowchart of an embodiment of a QoS-based multiplayer connection process 400. The process 400 can be implemented by any system that can access quality of service (QoS) information and determine a connection type for connecting at least a pair of user computing systems based at least in part on the QoS information. The process 400, in whole or in part, can be implemented by, for example, an interactive computing system 130, a QoS system 132, a match making system 146, a communication management system 138, or a user computing system 102, 106, 110, among others. Although any number of systems, in whole or in part, can implement the process 400, to simplify discussion, the process 400 will be described with respect to particular systems.

The process 400 begins at block 402 where a peer-to-peer connection is established between a pair of user computing systems. The pair of user computing systems may be identified by the match making system 136. Alternatively, or in addition, the pair of user computing systems may be identified to the match making system 136 by one or more of the pair of user computing systems. Further, some embodiments of the block 402 may include one or more of the embodiments for establishing a peer-to-peer connection as previously described with respect to the process 200. In some cases, the block 402, and the process 400, may be performed with respect to more than two user computing systems. However, to simplify discussion, and not to limit the present disclosure, the process 400 is primarily described with respect to a pair of user computing devices.

At block 404, the QoS system 132 accesses a QoS value for a QoS parameter associated with the peer-to-peer connection. The QoS parameter may include an available bandwidth, an amount or rate of packet loss, and/or a packet latency between the pair of user computing systems. In some embodiments, the QoS value may be derived based at least in part on a plurality of QoS parameters. For example, the QoS value may be an aggregation of multiple QoS parameters. As another example, the QoS value may be calculated be performing one or more mathematical algorithms on the or with respect to the QoS parameters. The QoS value may be obtained from one or more of the pair of user computing systems. Further, in some cases, at least a portion of the process 400 may be repeated or performed separately for each user computing system of the pair of user computing systems. For example, the operations associated with the blocks 404 and 406 may be repeated or performed separately for each user computing system. In some cases, the user computing systems may automatically provide the QoS value or data that can be used to calculate the QoS value. The QoS value or data may be provided at particular time intervals or in response to a triggering event, such as the start of a new match or threshold change in a QoS parameter, such as latency. In certain embodiments, the QoS system 132 may request QoS data from the user computing systems at particular time intervals.

At decision block 406, the QoS system 132 determines whether the QoS value satisfies a QoS threshold. In certain embodiments, the QoS threshold may depend on the QoS parameter being evaluated. In some cases, the QoS threshold may be dynamically adjusted based on one or more factors. These factors may include the availability of communication processing servers or resources at the communication processing servers, geographic and/or network locations of one or more of the user computing systems, the particular video game 112 to be played by the users of the user computing systems, and any other factors that may affect the determination of whether to use a peer-to-peer connection or a communication processing server to communicate.

If the QoS system 132 determines at the decision block 406 that the QoS value satisfies the QoS threshold, the process 400 returns to block 404 and repeats the corresponding operations associated with the block 404. In some embodiments, the operations associated with the blocks 404 and 406 may be performed repeatedly, on an intermittent basis, at particular time intervals, or in response to one of more event triggers. The event triggers may be based on the video game 112. For example, the video game 112 may cause the operations associated with the blocks 404 and 406 to be repeated for each round, level, or match between the users playing the video game 112. In some cases, the event trigger may be associated with a particular number of dropped packets or a particular detected latency.

If the QoS system 132 determines at the decision block 406 that the QoS value does not satisfy the QoS threshold, the communication management system 138 establishes a connection for the pair of user computing systems through a communication processing server at block 408. Embodiments for identifying a communication processing server and for establishing a connection with the communication processing server that may be performed as part of the block 408 are described with respect to the process 200 and the process 300.

Although described generally with respect to the pair of user computing systems, it should be understood that the process 400 may be performed separately for each of the user computing systems included in the pair of user computing systems. Further, in some cases, the process 400 may be performed for a plurality of user computing systems that may include more than two user computing systems. For example, the process 400 may be repeated for each pair of user computing systems in a set of user computing systems so as to establish communication between each pair of user computing systems in the set of user computing systems. For example, peer-to-peer connections may be established at block 402 between three user computing systems, which may result in three bidirectional peer-to-peer connections or six unidirectional connections with each user computing system having a peer-to-peer connection with each of the other two user computing systems.

Advantageously, in certain embodiments, the process 400 enables a communication connection between instances of a video game on a plurality of user computing systems to be switched from a peer-to-peer connection to a proxy connection via a communication processing server in response to a QoS of the peer-to-peer connection dropping below a threshold. Typically, the process 400 occurs when an instance of the video game 112 is initiated or before a playable instance of the video game 112 starts. For example, the process 400 may occur after the match making system 136 has identified a set of users to play as teammates and/or opponents or during a setup process for establishing the multiplayer instance of the video game 112. However, in certain embodiments, the process 400 may be performed during a playable instance of the video game 112 as is described in more detail below with respect to FIG. 6.

Example Connection Selection Process

Figure 5:
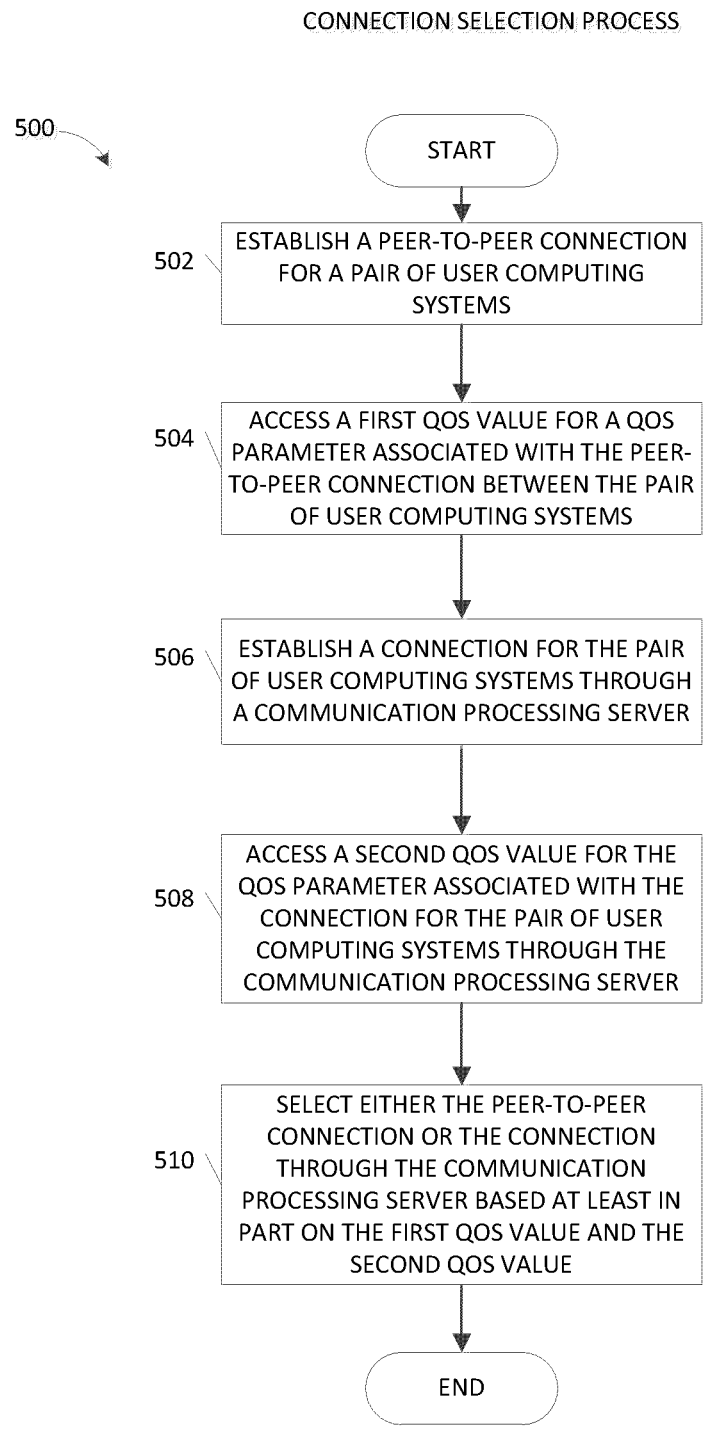
FIG. 5 presents a flowchart of an embodiment of a connection selection process.

FIG. 5 shows a flowchart of an embodiment of a connection selection process 500. The process 500 can be implemented by any system that can select a communication method or protocol for establishing communication between instance of a video game hosted on a plurality of user computing systems. The process 500, in whole or in part, can be implemented by, for example, an interactive computing system 130, a QoS system 132, a match making system 146, a communication management system 138, or a user computing system 102, 106, 110, among others. Although any number of systems, in whole or in part, can implement the process 500, to simplify discussion, the process 500 will be described with respect to particular systems.

The process 500 begins at block 502 where a peer-to-peer connection is established between a pair of user computing systems. In certain embodiments, the block 502 may include one or more of the embodiments described with respect to the block 402. At block 504, the QoS system 132 accesses a first QoS value for a QoS parameter associated with the peer-to-peer connection between the pair of user computing systems. In certain embodiments, the block 504 may include one or more of the embodiments described with respect to the block 404.

At block 506, the match making system 136 and/or the communication management system 138 establishes a connection for the pair of user computing systems through a communication processing server. The block 506 may include one or more of the embodiments described with respect to the processes 200 and 300 for obtaining connection information for connecting to a communication processing server and for establishing a connection with the communication processing server. At block 508, the QoS system 132 accesses a second QoS value for the QoS parameter associated with the connection for the pair of user computing systems through the communication processing server. In certain embodiments, the block 508 may include one or more of the embodiments described with respect to the block 404. In some embodiments, the QoS value may be determined by querying the communication processing server and/or a management system at the data center that includes the communication processing server.

At block 510, the QoS system 132 selects either the peer-to-peer connection or the connection through the communication processing server based at least in part on the first QoS value and the second QoS value. In some cases, the QoS system 132 may select the connection with the higher QoS value. However, in some cases, the QoS system 132 may select a particular connection, such as the connection through the communication processing server only when the second QoS value associated with the communication processing server is a threshold amount or percentage higher than the first QoS value associated with the peer-to-peer connection or when one QoS value is below a particular threshold. Advantageously, in certain embodiments, by requiring a minimum or threshold performance improvement to switch from a peer-to-peer connection to communication via the communication processing server, the amount of computing resources used to support multiplayer instance of a video game may be reduced without degrading a quality of the play experience to a level that is noticeable by the users. For example, if the improvement in latency is undetectable by a user when switching to a proxy communication via the communication processing server, the peer-to-peer connection may be used. Thus, in this particular example, the amount of computing resources needed to support a multiplayer gaming experience is reduced because, for example, less communication processing servers can be maintained compared to systems that always use proxy based communication or that use proxy based communication regardless of the amount of improvement in QoS compared to the peer-to-peer connection.

In certain embodiments, the block 510 may include disconnecting or dropping the connection that is not selected. For example, if the peer-to-peer connection is selected, the connection to the communication processing server may be dropped. As described above, not using the communication processing server when the peer-to-peer connection satisfies a threshold QoS parameter can reduce the amount of computing resources for enabling multiplayer game play. However, in certain embodiments, both connections may be maintained enabling the video game 112 to switch between connections when the QoS of one of the connections, such as the peer-to-peer connection, falls or is reduced below a threshold value. Further, in some embodiments, maintaining both connections may enable the video game instance on one user computing system to communicate with the video game instance on another user computing system using both connections thereby, enabling, in some cases, faster communication compared to using a single connection. Further, by maintaining both connections between the video game instances, a more robust and resilient communication path may be maintained between the instances of the video game compared to maintaining a single connection between the video game instances, which may result in increased reliability for the connection.

Although described generally with respect to the pair of user computing systems, it should be understood that the process 500 may be performed separately for each of the user computing systems included in the pair of user computing systems. Further, in some cases, the process 500 may be performed for a plurality of user computing systems that may include more than two user computing systems. For example, the process 500 may be repeated for each pair of user computing systems in a set of user computing systems so as to establish communication between each pair of user computing systems in the set of user computing systems. For example, a peer-to-peer connection may be established at block 502 between three user computing systems, which may result in three bidirectional peer-to-peer connections or six unidirectional connections with each user computing system having a peer-to-peer connection with each of the other two user computing systems. Further, each user computing system may establish a connection with the communication processing server at the block 506. Thus, there may be three bidirectional connections to the communication processing server or up to six unidirectional connections to the communication processing server.

Example In-Video Game Connection Selection Process

Figure 6:
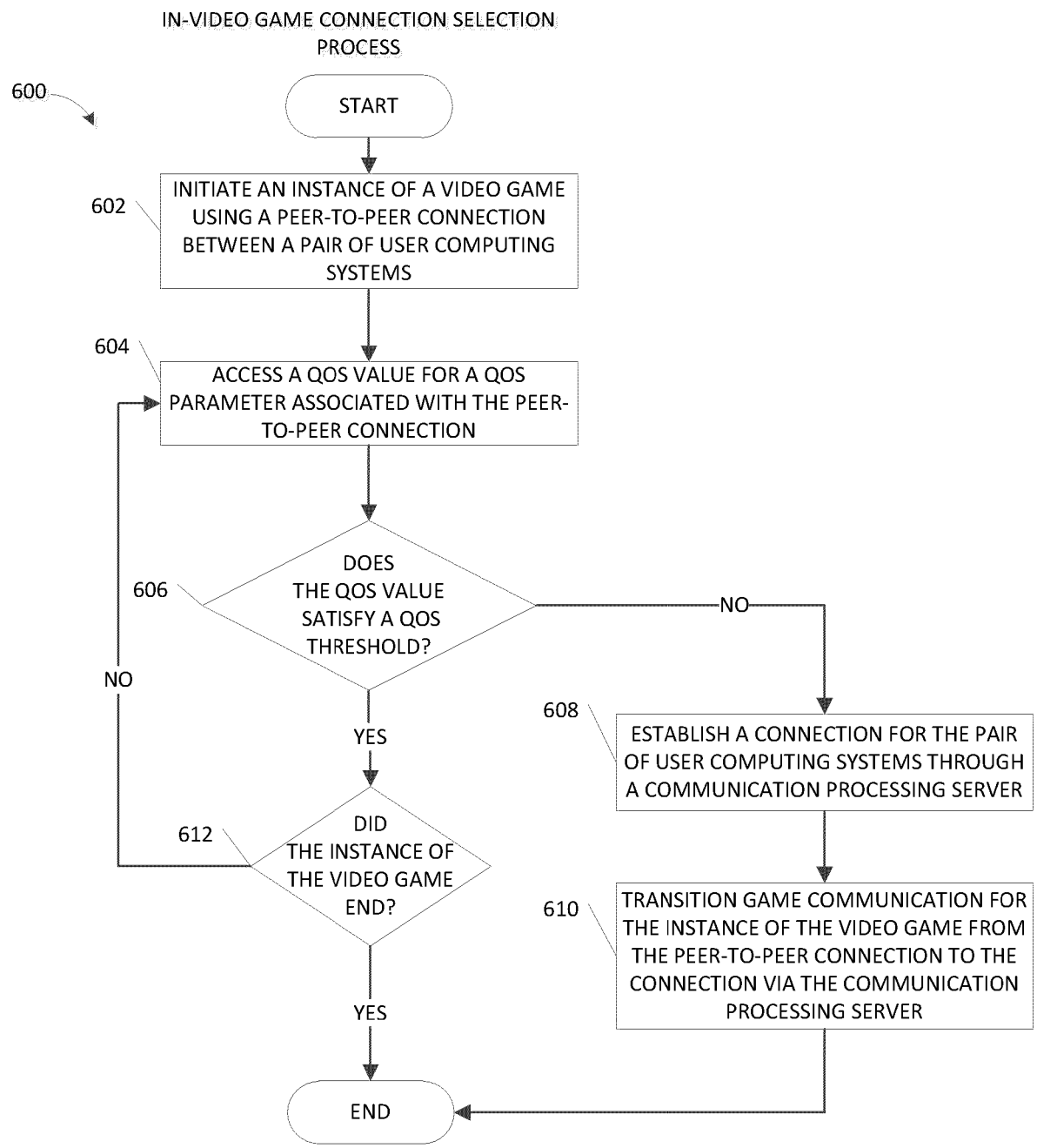
FIG. 6 presents a flowchart of an embodiment of an in-video game connection selection process.

FIG. 6 shows a flowchart of an embodiment of an in-video game connection selection process 600. The process 600 can be implemented by any system that can monitor QoS information during play of a video game and transition from one type of connection to another type of connection between user computing systems in response to a threshold change in the QoS information. The process 600, in whole or in part, can be implemented by, for example, an interactive computing system 130, a QoS system 132, a match making system 146, a communication management system 138, or a user computing system 102, 106, 110, among others. Although any number of systems, in whole or in part, can implement the process 600, to simplify discussion, the process 600 will be described with respect to particular systems.

To simplify discussion and not to limit the present disclosure, the process 600 is described with respect to a pair of user computing systems. However, it should be understood that the process 600 may be performed with respect to more than two user computing systems. Further, at least portions of the process 600 may be performed separately or repeated for each user computing system of the pair of user computing systems.

The process 600 begins at block 602 where an instance of a video game is initiated using a peer-to-peer connection between a pair of user computing systems. The peer-to-peer connection may be established using one or more of the embodiments previously described, such as embodiments described with respect to the process 200. Further, once the peer-to-peer connection is established, a playable portion of an instance of the video game may be initiated. In some cases, the video game application is initiated prior to the peer-to-peer connection being established. Further, the video game application may initiate the process of establishing the peer-to-peer connection. After the peer-to-peer connection is established, a playable portion of the video game application may be initiated. For example, a user may interact with a setup or start screen of the video game 112 to configure a multiplayer instance of the video game to play with other users. Once the setup with respect to establishing a connection with user computing systems of other users is completed, the playable portion of the video game may be started. It should be understood that, in some embodiments, a playable portion of the video game may be instantiated prior to the peer-to-peer connection being established between a pair of user computing systems. For example, a user may opt to join a game that is already in progress. Thus, a peer-to-peer connection may be established subsequent to the initiation of a playable portion of the video game 112.

At block 604, the QoS system 132 accesses a QoS value for a QoS parameter associated with the peer-to-peer connection between the pair of user computing systems. In certain embodiments, the block 604 may include one or more of the embodiments previously described with respect to the block 404. At decision block 606, the QoS system 132 determines whether the QoS value satisfies a QoS threshold. In certain embodiments, the decision block 606 may include one or more of the embodiments previously described with respect to the decision block 406.

If the QoS value does not satisfy the QoS threshold, the process 600 proceeds to block 608 where the communication management system establishes a connection for the pair of user computing systems through a communication processing server. In certain embodiments, the block 608 can include one or more of the embodiments previously described with respect to the process 200 and the process 300. At block 610, game communication is transitioned for the instance of the video game from the peer-to-peer connection to the connection via the communication processing server. Transitioning the game communication can include configuring instances of the video game 112 hosted by the pair of user computing systems and/or configuring network components of the pair of user computing systems to transmit game commands, game data, and/or game state information to each other via the communication processing server. Operations performed as part of the block 610 may be performed by one or more of the user computing systems that are hosting the video game 112 whose communication is being transitioned, the match making system 136, or the communication management system 138. Further, the block 610 may include dropping or discontinuing the peer-to-peer connection. In some cases, the peer-to-peer connection may be maintained enabling the game communication to be switched or transitioned back to the peer-to-peer connection if the QoS value improves to above a threshold level. Further, although the process 600 is described with respect to transitioning from a peer-to-peer connection to a hosted or proxy connection via a communication processing server, it should be understood that the process 600 may be modified to perform the opposite process. Thus, in some embodiments, the process 600 may be modified to transition from a hosted or proxy communication connection to a peer-to-peer connection.

If it is determined at the decision block 606 that the QoS value satisfies the QoS threshold, the process determines whether the instance of the video game has completed at decision block 612. Determining whether the instance of the video game has completed may include determining whether a user has exited the video game 112, indicated a desire to leave a multiplayer portion of the video game 112 (for example, quit the multiplayer match), or completed a multiplayer match or round within the video game 112. In some cases, based on the particular video game 112, the completion of a match may or may not indicate the completion of the instance of the video game. For example, with some video games, each match is played with a particular match plan and upon completion of the match, a new multiplayer instance is started or a new match plan may be identified. However, with some other video games, after the completion of the match, the multiplayer connection is maintained enabling the start of a new match with the same users.

If it is determined at the decision block 612 that the instance of the video game has completed, the process 600 may end and/or may be repeated with a new instance of the video game 112 or of another video game. If it is determined at the decision block 612 that the instance of the video game has not completed because, for example, the users are continuing to play the instance of the video game, the process 600 may return to the block 604 where the QoS system 132 may continue to monitor the QoS value for the peer-to-peer connection.

overview of Computing System

Figure 7:
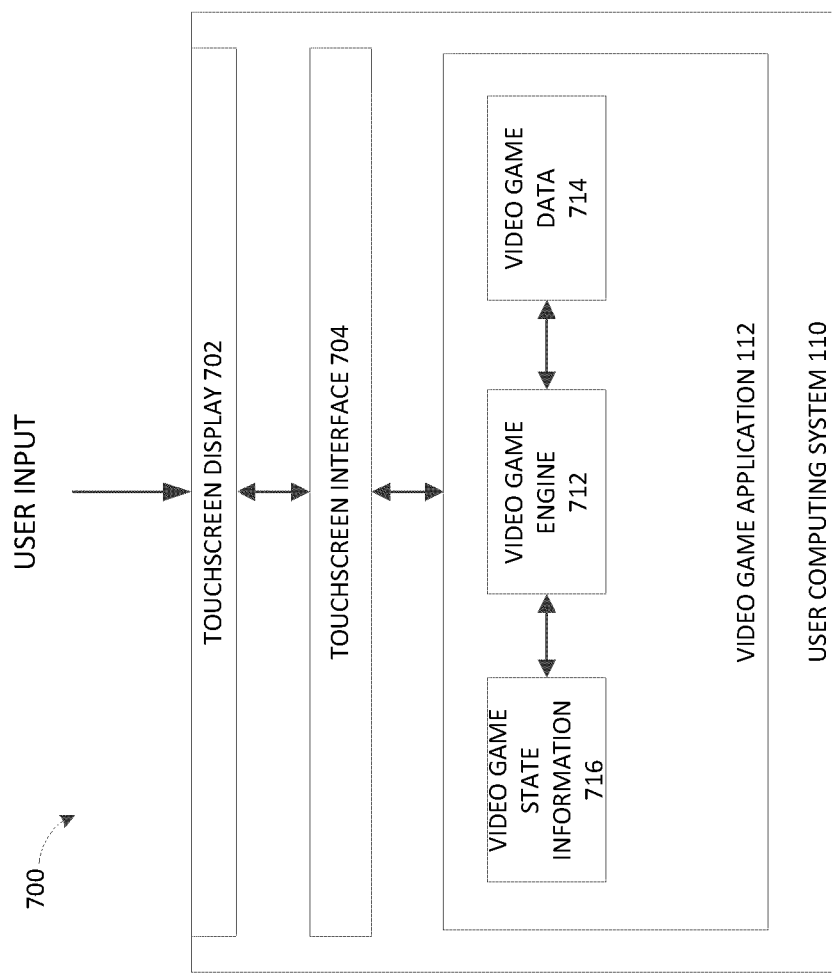
FIG. 7 illustrates an embodiment of a user computing system.

FIG. 7 illustrates an embodiment of a user computing system 110, which may also be referred to as a gaming system. It should be understood that each of the user computing systems 102 and 106 may be configured similarly or the same as the user computing system 110. Alternatively, one or more of the user computing systems 102 and 106 may have different configurations than each other and/or the user computing system 110. As illustrated, the user computing system 110 may be a single computing device that can include a number of elements. However, in some cases, the user computing system 110 may include multiple devices. For example, the user computing system 110 may include one device that includes that includes a central processing unit and a graphics processing unit, another device that includes a display, and another device that includes an input mechanism, such as a keyboard or mouse.

The user computing system 110 can be an embodiment of a computing system that can execute a game system. In the non-limiting example of FIG. 7, the user computing system 110 is a touch-capable computing device capable of receiving input from a user via a touchscreen display 702. However, the user computing system 110 is not limited as such and may include non-touch capable embodiments, which do not include a touchscreen display 702.

The user computing system 110 includes a touchscreen display 702 and a touchscreen interface 704, and is configured to execute a game application 112. This game application may be the video game 112 or an application that executes in conjunction with or in support of the video game 112, such as a video game execution environment. Although described as a game application 112, in some embodiments the application 112 may be another type of application that may be capable of interacting with multiple users across multiple user computing systems, such as educational software or language software. While user computing system 110 includes the touchscreen display 702, it is recognized that a variety of input devices may be used in addition to or in place of the touchscreen display 702.

The user computing system 110 can include one or more processors, such as central processing units (CPUs), graphics processing units (GPUs), and accelerated processing units (APUs). Further, the user computing system 110 may include one or more data storage elements. In some embodiments, the user computing system 110 can be a specialized computing device created for the purpose of executing game applications 112. For example, the user computing system 110 may be a video game console. The game applications 112 executed by the user computing system 110 may be created using a particular application programming interface (API) or compiled into a particular instruction set that may be specific to the user computing system 110. In some embodiments, the user computing system 110 may be a general purpose computing device capable of executing game applications 112 and non-game applications. For example, the user computing system 110 may be a laptop with an integrated touchscreen display or desktop computer with an external touchscreen display. Components of an example embodiment of a user computing system 110 are described in more detail with respect to FIG. 8.

The touchscreen display 702 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 702. The touchscreen interface 704 can be configured to translate the touch input into data and output the data such that it can be interpreted by components of the user computing system 110, such as an operating system and the game application 112. The touchscreen interface 704 can translate characteristics of the tactile touch input touch into touch input data. Some example characteristics of a touch input can include, shape, size, pressure, location, direction, momentum, duration, and/or other characteristics. The touchscreen interface 704 can be configured to determine the type of touch input, such as, for example a tap (for example, touch and release at a single location) or a swipe (for example, movement through a plurality of locations on touchscreen in a single touch input). The touchscreen interface 704 can be configured to detect and output touch input data associated with multiple touch inputs occurring simultaneously or substantially in parallel. In some cases, the simultaneous touch inputs may include instances where a user maintains a first touch on the touchscreen display 702 while subsequently performing a second touch on the touchscreen display 702. The touchscreen interface 704 can be configured to detect movement of the touch inputs. The touch input data can be transmitted to components of the user computing system 110 for processing. For example, the touch input data can be transmitted directly to the game application 112 for processing.

In some embodiments, the touch input data can undergo processing and/or filtering by the touchscreen interface 704, an operating system, or other components prior to being output to the game application 112. As one example, raw touch input data can be captured from a touch input. The raw data can be filtered to remove background noise, pressure values associated with the input can be measured, and location coordinates associated with the touch input can be calculated. The type of touch input data provided to the game application 112 can be dependent upon the specific implementation of the touchscreen interface 704 and the particular API associated with the touchscreen interface 704. In some embodiments, the touch input data can include location coordinates of the touch input. The touch signal data can be output at a defined frequency. Processing the touch inputs can be computed many times per second and the touch input data can be output to the game application for further processing.

A game application 112 can be configured to be executed on the user computing system 110. The game application 112 may also be referred to as a video game, a game, game code and/or a game program. A game application should be understood to include software code that a user computing system 110 can use to provide a game for a user to play. A game application 112 might comprise software code that informs a user computing system 110 of processor instructions to execute, but might also include data used in the playing of the game, such as data relating to constants, images and other data structures. For example, in the illustrated embodiment, the game application includes a game engine 712, game data 714, and game state information 716.

The touchscreen interface 704 or another component of the user computing system 110, such as the operating system, can provide user input, such as touch inputs, to the game application 112. In some embodiments, the user computing system 110 may include alternative or additional user input devices, such as a mouse, a keyboard, a camera, a game controller, and the like. A user can interact with the game application 112 via the touchscreen interface 704 and/or one or more of the alternative or additional user input devices. The game engine 712 can be configured to execute aspects of the operation of the game application 112 within the user computing system 110. Execution of aspects of gameplay within a game application can be based, at least in part, on the user input received, the game data 714, and game state information 716. The game data 714 can include game rules, prerecorded motion capture poses/paths, environmental settings, constraints, animation reference curves, skeleton models, and/or other game application information. Further, the game data 714 may include information that is used to set or adjust the difficulty of the game application 112.

The game engine 712 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 112, the game application 112 can store game state information 716, which can include character states, environment states, scene object storage, and/or other information associated with a state of execution of the game application 112. For example, the game state information 716 can identify the state of the game application at a specific point in time, such as a character position, character action, game level attributes, and other information contributing to a state of the game application.

The game engine 712 can receive the user inputs and determine in-game events, such as actions, collisions, runs, throws, attacks and other events appropriate for the game application 112. During operation, the game engine 712 can read in game data 714 and game state information 716 in order to determine the appropriate in-game events. In one example, after the game engine 712 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can conveyed to a renderer, which can generate a new frame for display to the user. The process can be repeated for rendering each frame during execution of the game application. Though the process has been described in the context of a character, the process can be applied to any process for processing events and rendering the output for display to a user.

Example Hardware Configuration of Computing System

Figure 8:
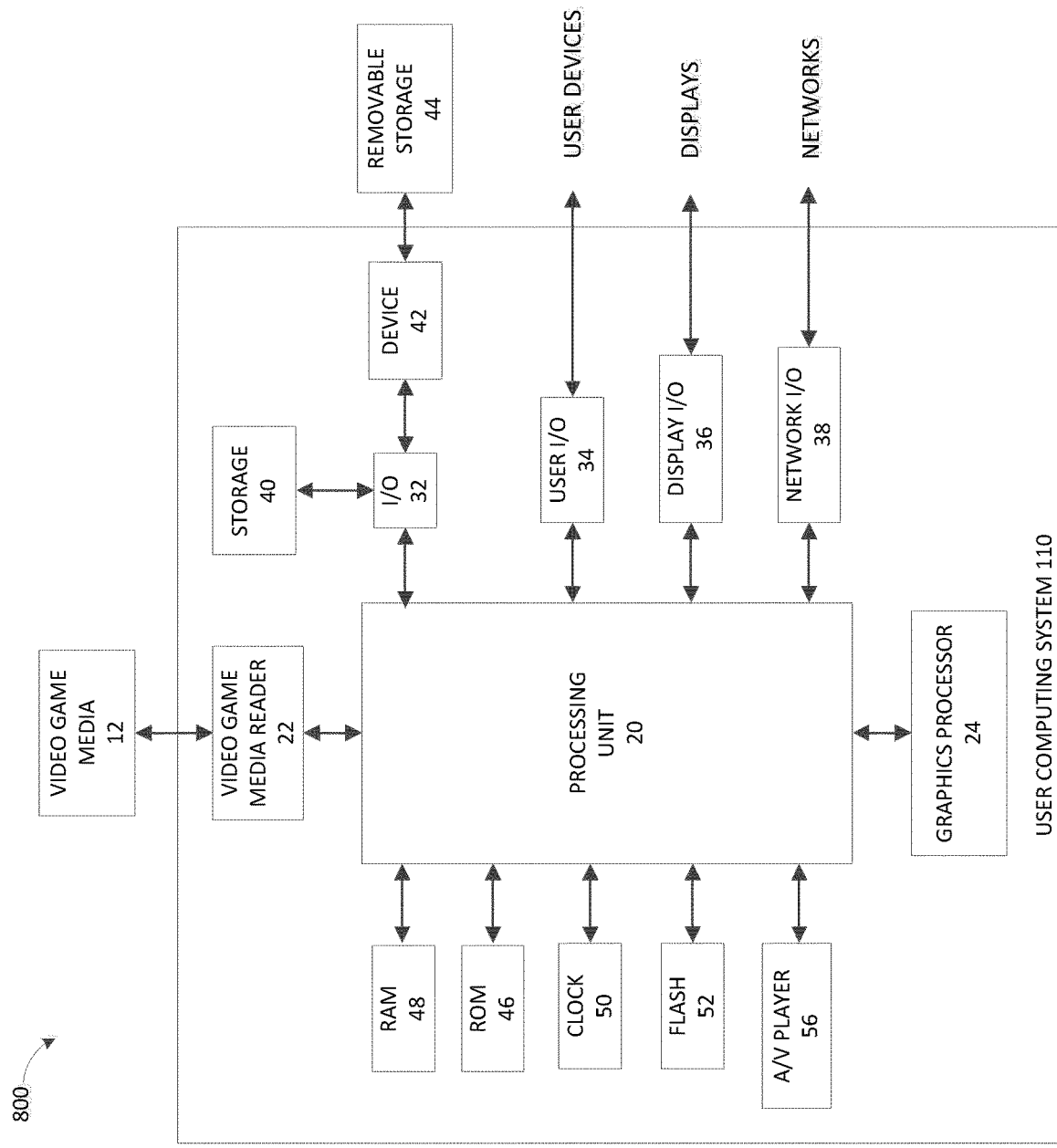
FIG. 8 illustrates an embodiment of a hardware configuration for the user computing system of FIG. 7.

FIG. 8 illustrates an embodiment of a hardware configuration for the user computing system 110 of FIG. 7. It should be understood that each of the user computing systems 102 and 106 may be configured similarly or the same as the user computing system 110. Alternatively, one or more of the user computing systems 102 and 106 may have different configurations than each other and/or the user computing system 110. Other variations of the user computing system 110 may be substituted for the examples explicitly presented herein, such as removing or adding components to the user computing system 110. The user computing system 110 may include a dedicated game device, a smart phone, a tablet, a personal computer, a desktop, a laptop, a smart television, a car console display, and the like. Further, (although not explicitly illustrated in FIG. 8) as described with respect to FIG. 7, the user computing system 110 may optionally include a touchscreen display 702 and a touchscreen interface 704.

As shown, the user computing system 110 includes a processing unit 20 that interacts with other components of the user computing system 110 and also components external to the user computing system 110. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The user computing system 110 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 110 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 110 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for the user computing system 110. Processing unit 20 can communicate through I/O 32 to store data, such as game state data and any shared data files. In addition to storage 40 and removable storage media 44, computing device 700 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing device 700 on a display device, such as graphics, user interfaces, video, and/or other visual content. The user computing system 110 may comprise one or more integrated displays configured to receive display output signals produced by the display I/O 36, which may be output for display to a user. According to some embodiments, display output signals produced by the display I/O 36 may also be output to one or more display devices external to the user computing system 110.

The user computing system 110 can also include other features that may be used with a game, such as a clock 50, flash memory 52, and other components. An audio/video player 56 might also be used to play a video sequence, such as a movie. It should be understood that other components may be provided in the user computing system 110 and that a person skilled in the art will appreciate other variations of the user computing system 110.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user computing system 110 is turned off or loses power.

As user computing system 110 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

ADDITIONAL EMBODIMENTS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
as implemented by an interactive computing system configured with specific computer-executable instructions,
receiving a first request from a first user computing system to play an instance of a video game, wherein the first user computing system is configured to present the video game for playing by a first user;
obtaining first connection information for establishing a peer-to-peer connection with the first user computing system, the first connection information indicating a first internet protocol (IP) address associated with the first user computing system;
receiving a second request from a second user computing system to play the instance of the video game, wherein the second user computing system is configured to present the video game for playing by a second user;
obtaining second connection information for establishing the peer-to-peer connection with the second user computing system, the second connection information indicating a second internet protocol (IP) address associated with the second user computing system;
providing the first connection information to the second user computing system and the second connection information to the first user computing system enabling the first user computing system and the second user computing system to establish the peer-to-peer connection with each other, wherein game information associated with the video game is routed via the peer-to-peer connection, wherein the first user computing system communicates game information to the second IP address, and wherein the second user computing system communications game information to the first IP address;
obtaining one or more measurements associated with a quality of the established peer-to-peer connection between the first user computing system and the second user computing system; and
determining, during gameplay of the video game based on the measurements, whether a proxy connection is to be selected instead of the peer-to-peer connection to route the game information, wherein the proxy connection routes the game information between the first user computing system and the second user computing system via a communication processing server,
wherein, during gameplay, and in response to determining that the proxy connection is to be selected:
obtaining proxy connection information for connecting to the communication processing server, the proxy connection information indicating a third IP address associated with the communication processing server; and
instructing the first user computing system and second user computing system to disconnect from the peer-to-peer connection and establish respective connections with the communication processing server,
wherein the first user computing system and second user computing system communicate respective game information to the third IP address, such that the first user computing system and second user computing system transmit and receive respective game information via the communication processing server.

2. The computer-implemented method of claim 1, wherein the first user computing system and the second user computing system are selected to play the instance of the video game using a match making selection algorithm.

3. The computer-implemented method of claim 1, wherein the communication processing server is selected from a plurality of communication processing servers based at least in part on a set of selection criteria.

4. The computer-implemented method of claim 3, wherein the selection criteria includes one or more of the following: an identity of the video game; a first geographic location of the first user computing system; a second geographic location of the second user computing system; or an availability of connection resources at the communication processing server.

5. The computer-implemented method of claim 1, further comprising reserving connection resources at the communication processing server for connecting to the communication processing server.

6. The computer-implemented method of claim 1, wherein determining whether a measurement associated with a quality of the peer-to-peer connection comprises a quality of service (QoS) value associated with the peer-to-peer connection, and wherein determining that the proxy connection is to be selected is based on the QoS value satisfying a QoS threshold.

7. The computer-implemented method of claim 1, wherein, in response to determining that the proxy connection is not to be selected, the method further comprises:
causing a first playable instance of the video game to be initiated at the first user computing system and a second playable instance of the video game to be initiated at the second user computing system.

8. The computer-implemented method of claim 7, wherein the first playable instance of the video game and the second playable instance of the video game are portions of a single playable instance of the video game and wherein the first playable instance of the video game and the second playable instance of the video game communicate via the peer-to-peer connection.

9. The computer-implemented method of claim 1, wherein, in response to determining that the proxy connection is not to be selected, the method further comprises:
obtaining a quality of service (QoS) value for a QoS parameter associated with the peer-to-peer connection during gameplay of the video game;
determining whether the QoS value satisfies a QoS threshold; and
in response to determining that the QoS value does not satisfy the QoS threshold,
obtaining the proxy connection information for connecting to the communication processing server; and
providing the proxy connection information to the first user computing system and the second user computing system enabling the first user computing system and the second user computing system to establish the communication connection with each other via the communication processing server.

10. A system comprising:
an electronic data store configured to store connection information for a plurality of communication processing servers;
a hardware processor in communication with the electronic data store, the hardware processor configured to execute specific computer-executable instructions to at least:
receive an identity of a plurality of user computing systems selected to host a multiplayer instance of a video game, wherein the user computing systems are configured to present the video game for playing by respective users;

obtain first connection information for each user computing system from the plurality of user computing systems, the first connection information indicating an internet protocol (IP) address associated with a respective user computing system;

provide the first connection information to establish a peer-to-peer connection with the user computing systems to each user computing system, wherein game information associated with the video game is routed via the peer-to-peer connection between the user computing systems, and wherein each user computing system communicates the game information to other user computing systems via respective IP addresses;

obtain one or more measurements associated with a quality of the established peer-to-peer connection; and determine, based on the measurements, whether a proxy connection is to be selected instead of the peer-to-peer connection to route the game information between a first user computing system a second user computing system of the user computing systems, wherein the proxy connection routes game information between the first user computing system and the second user computing system via a communication processing server, wherein in response to determining that the proxy connection is to be selected:

obtain, from the electronic data store, second connection information for the communication processing server from the plurality of communication processing servers, the second connection information indicating a proxy IP address associated with the communication processing server; and instruct the first user computing system and second user computing system to disconnect from the peer-to-peer connection and establish connections with the communication processing server, wherein the first user computing system and second user computing system communicate respective game information to the proxy IP address, such that the first user computing system and second user computing system transmit and receive respective game information via the communication processing server.

11. The system of claim 10, wherein, in response to determining that the proxy connection is not to be selected, the hardware processor is further configured to execute specific computer-executable instructions to at least:

obtain a first quality of service (QoS) value for a QoS parameter associated with the peer-to-peer connection;

obtain a second QoS value for the QoS parameter associated with a proxy connection between the first user computing system and the communication processing server; and select one of the peer-to-peer connection or the proxy connection based at least in part on the first QoS value and the second QoS value.

12. The system of claim 11, wherein selecting one of the peer-to-peer connection or the proxy connection comprises selecting the peer-to-peer connection based on the second QoS value being less than a threshold level higher than the first QoS value.

13. The system of claim 11, wherein the hardware processor is further configured to execute specific computer-executable instructions to at least disconnect one of the peer-to-peer connection or the proxy connection that is not selected.

14. The system of claim 10, wherein, in response to determining that the proxy connection is not to be selected, the hardware processor is further configured to execute specific computer-executable instructions to at least cause the multiplayer instance of the video game to be initiated between at least a first user of the first user computing system and a second user of the second user computing system.

15. The system of claim 14, wherein game information associated with the multiplayer instance of the video game is transmitted between the first user computing system and the second user computing system via the peer-to-peer connection.

16. The system of claim 15, wherein the game information is transmitted to a third user computing system from the plurality of user computing systems via a proxy communication connection to the communication processing server.

17. A non-transitory computer-readable storage medium storing computer executable instructions that, when executed by one or more computing devices, configure the one or more computing devices to perform operations comprising:

selecting a plurality of users to play a multiplayer instance of a video game, wherein each user from the plurality of users is associated with a different user computing system from a plurality of user computer systems and wherein the number of user computing systems in the plurality of user computer systems is equal to the number of users in the plurality of users;

obtaining first connection information for each user computing system from the plurality of user computing systems, the first connection information indicating an internet protocol (IP) address associated with a respective user computing system;

providing connection information associated with the user computing systems to each user computing system, wherein the user computing systems establish a peer-to-peer connection, wherein game information associated with the video game is routed via the peer-to-peer connection, and wherein each user computing system communicates the game information to other user computing systems via respective IP addresses;

obtaining one or more measurements associated with a quality of the established peer-to-peer connection; and determining, based on the measurements, whether a proxy connection is to be selected instead of the peer-to-peer connection to route the game information between a first user computing system a second user computing system of the user computing systems, wherein the proxy connection routes game information between the first user computing system and second user computing system via a communication processing server, wherein in response to determining that the proxy connection is to be selected:

obtaining second connection information for the communication processing server, the second connection information indicating a proxy IP address associated with the communication processing server; and instructing the first user computing system and second user computing system to disconnect from the peer-to-peer connection and establish connections with the communication processing server, wherein the first user computing system and second user computing system communicate respective game information to the third IP address, such that the first user computing system and second user computing system transmit and receive respective game information via the communication processing server.

18. The computer-readable, non-transitory storage medium of claim 17, wherein the communication processing server is one of a plurality of communication processing servers, wherein the communication processing server is selected from the plurality of communication processing servers based at least in part on a deployment pool associated with the video game, and wherein the deployment pool is one of a plurality of deployment pools.

19. The computer-readable, non-transitory storage medium of claim 17, wherein, in response to determining that the proxy connection is not be selected the operations further comprise:
- monitoring a quality of service (QoS) value for a QoS parameter associated with the peer-to-peer connection; and
- in response to determining that the QoS value ceases to satisfy a QoS threshold, transitioning communication from the first user computing system to the second user computing system over the peer-to-peer connection to the proxy connection via the communication processing server.

20. The computer-readable, non-transitory storage medium of claim 17, wherein, in response to determining that the proxy connection is not to be selected, the operations further comprise triggering initiation of execution of the multiplayer instance of the video game.

* * * * *